United States Patent
Hogan et al.

(10) Patent No.: US 9,609,492 B2
(45) Date of Patent: Mar. 28, 2017

(54) METHOD AND SYSTEM FOR DYNAMICALLY CREATING TUNNELS SUITABLE FOR METERING AND MANAGING USAGE DATA FOR APPLICATIONS AND SERVICES

(71) Applicant: OPENET TELECOM LTD., Dublin (IE)

(72) Inventors: Joe Hogan, Dublin (IE); Mamoon Chowdry, Westwood, MA (US)

(73) Assignee: OPENET TELECOM LTD., Dublin (IE)

( * ) Notice: Subject to any disclaimer, the term of this patent is extended or adjusted under 35 U.S.C. 154(b) by 77 days.

(21) Appl. No.: 14/514,479

(22) Filed: Oct. 15, 2014

(65) Prior Publication Data

US 2015/0109967 A1    Apr. 23, 2015

Related U.S. Application Data

(60) Provisional application No. 61/892,276, filed on Oct. 17, 2013.

(51) Int. Cl.
*H04L 12/16* (2006.01)
*H04W 4/12* (2009.01)
(Continued)

(52) U.S. Cl.
CPC .......... *H04W 4/12* (2013.01); *H04L 12/1407* (2013.01); *H04L 12/1485* (2013.01);
(Continued)

(58) Field of Classification Search
CPC ..... H04W 4/12; H04W 76/022; H04W 15/66; H04W 12/06; H04M 15/60; H04M 15/09;
(Continued)

(56) References Cited

U.S. PATENT DOCUMENTS 5,603,026 A    2/1997    Demers et al.
5,787,262 A    7/1998    Shakib et al.
(Continued)

OTHER PUBLICATIONS

Sarin, S. et al., "Using History Information to Process Delayed Database Updates", Computer Corporation of America, Four Cambridge Center, Cambridge, Massachusetts 02142, Aug. 1986, pp. 71-78.

*Primary Examiner* — Robert Wilson
(74) *Attorney, Agent, or Firm* — The Marbury Law Group, PLLC

(57) ABSTRACT

A server computing device may be deployed in telecommunication signaling network and configured to communicate with a subscriber profile repository, policy management component, a charging component, and/or other components in the network to intelligently determine whether a user equipment device should receive/use a service via a communication tunnel, to authorize and/or create a communication tunnel between a user equipment device and a tunnel termination function component, and to implement policy charging rules for the use of the service via the communication tunnel. The communication tunnel may carry a portion or a segment of a data flow for a specific service (or a portion of the communication link) between the user equipment device and a destination component. The server computing device may be configured to authorize/create different communication tunnels for different services and to implement different policy charging rules for different tunnels.

18 Claims, 11 Drawing Sheets

(51) Int. Cl.
  *H04W 76/02* (2009.01)
  *H04M 15/00* (2006.01)
  *H04L 29/06* (2006.01)
  *H04W 12/06* (2009.01)
  *H04L 12/24* (2006.01)
  *H04L 12/14* (2006.01)
  *H04L 29/12* (2006.01)

(52) U.S. Cl.
  CPC ...... *H04L 41/5022* (2013.01); *H04L 63/0272* (2013.01); *H04L 63/0823* (2013.01); *H04M 15/09* (2013.01); *H04M 15/41* (2013.01); *H04M 15/43* (2013.01); *H04M 15/44* (2013.01); *H04M 15/60* (2013.01); *H04M 15/61* (2013.01); *H04M 15/66* (2013.01); *H04M 15/8033* (2013.01); *H04W 12/06* (2013.01); *H04W 76/022* (2013.01); *H04L 61/203* (2013.01); *H04L 61/2007* (2013.01)

(58) Field of Classification Search
  CPC ...... H04M 15/41; H04M 15/43; H04M 15/44; H04M 15/62; H04M 15/8033; H04L 63/0272; H04L 63/0823; H04L 41/5022; H04L 12/1407; H04L 12/1485; H04L 61/2007; H04L 61/203
  See application file for complete search history.

(56) References Cited

U.S. PATENT DOCUMENTS

| | | | |
|---|---|---|---|
| 7,117,526 B1* | 10/2006 | Short | G06Q 20/3674 380/281 |
| 7,509,354 B2 | 3/2009 | McGarvey | |
| 7,627,611 B2 | 12/2009 | Gusciora | |
| 8,094,652 B2* | 1/2012 | Hallenstal | H04L 65/1069 370/352 |
| 2007/0255763 A1 | 11/2007 | Beyerle et al. | |
| 2009/0248880 A1* | 10/2009 | Kim | G06Q 30/0601 709/227 |
| 2011/0268086 A1* | 11/2011 | Liang | H04W 36/0055 370/331 |
| 2013/0166746 A1* | 6/2013 | Andreasen | H04L 41/0893 709/225 |
| 2014/0004815 A1* | 1/2014 | Shaw | H04L 12/1407 455/405 |
| 2014/0068750 A1* | 3/2014 | Tjahjono | H04L 63/029 726/15 |
| 2014/0073285 A1* | 3/2014 | Lehane | H04W 4/26 455/406 |
| 2015/0085664 A1* | 3/2015 | Sachdev | H04W 28/0215 370/236 |
| 2015/0109967 A1* | 4/2015 | Hogan | H04W 76/022 370/259 |

* cited by examiner

702

| # | IP Address | Description | Subscriber ID |
|---|---|---|---|
| 1 | 192.178.1.12:10600 | Device IP Adress | 5715553785 |

| # | IP Address | Description | Subscriber ID |
|---|---|---|---|
| 1 | 172.2.3.41:10600 | Tunnel_IM | 5715553785 |
| 2 | 172.2.3.42:10601 | Tunnel_WEB | 5715553785 |
| 3 | 172.2.3.43:10602 | Tunnel_VIDEO | 5715553785 |

| # | IP Address | Description | Subscriber ID |
|---|---|---|---|
| 1 | 172.2.3.41:10600 | Tunnel_IM | 5715553785 |
| 2 | 172.2.3.42:10601 | Tunnel_WEB | 5715553785 |
| 3 | 172.2.3.43:10602 | Tunnel_VIDEO_CORP | 5715553785 |
| 4 | 172.2.3.43:10603 | Tunnel_VIDEO_CONF_CORP | 5715553785 |
| 5 | 172.2.9.50:10604 | Tunnel_VIDEO_STREAM1 | 5715553785 |
| 6 | 172.2.9.50:10605 | Tunnel_VIDEO_STREAM2 | 5715553785 |

FIG. 7C

METHOD AND SYSTEM FOR DYNAMICALLY CREATING TUNNELS SUITABLE FOR METERING AND MANAGING USAGE DATA FOR APPLICATIONS AND SERVICES

RELATED APPLICATIONS

This application claims the benefit of priority to U.S. Provisional Application No. 61/892,276, titled "Dynamically Created VPN Tunnels to Meter and Manage Usage Data for Applications and Services" filed Oct. 17, 2013, the entire contents of which are hereby incorporated by reference.

BACKGROUND

Wireless and cellular communication technologies have seen dramatic improvements over the past few years. Cellular service providers now offer users a wide array of services, higher usage limits and attractive subscription plans. Wireless dongles and embedded wireless modem cards allow users to use tablet computers, netbooks and laptops to access wireless Internet protocol (IP) and data services through the cellular networks. Internet-enabled smart user devices, such as smartphone and tablets, have become essential personal accessories, connecting users to friends, work, leisure activities and entertainment. As more users utilize these services, smart user devices continue to grow in popularity and use, and the users become increasingly dependent on and consume increasing amounts of higher value content on their devices, new and improved solutions that allow the telecommunication network operators to implement new business models that allow them to grow their revenue streams while increasing customer loyalty will be beneficial to the telecommunication networks, network operators, and to the consumers of the telecommunication services.

SUMMARY

The various embodiments include methods of dynamically creating communication tunnels in a telecommunication network, which may include receiving in a processor of a server computing device a service request message that includes information identifying a service to be used by a user equipment device, determining by the processor whether the requested service should be used by the user equipment device via a communication tunnel, sending a communication message to a policy management component to cause the policy management component to generate policy charging rules for the use of the requested service via the communication tunnel in response to determining that the requested service should be used by the user equipment device via the communication tunnel, selecting and assigning an available Internet protocol (IP) address from a plurality of IP address for using the requested service via the communication tunnel, and sending a service response message to the user equipment device to begin using the requested service via the communication tunnel.

In an embodiment, determining whether the requested service should be used by the user equipment device via the communication tunnel includes querying a subscriber profile repository to receive subscription information, and using the subscription information to determine whether the requested service should be used by the user equipment device via the communication tunnel. In a further embodiment, determining whether the requested service should be used by the user equipment device via the communication tunnel includes authenticating credentials included in the received service request message, and validating a data usage entitlement of the user equipment device. In a further embodiment, authenticating the credentials included in the received service request message includes using subscription identifier information (e.g., a mobile station international subscriber directory number (MSISDN), an international mobile subscriber identity (IMSI)) or UE device identification information (e.g., an international mobile station equipment identity (IMEI) value media access control (MAC) address value) and a framed IP address value included in the received service request message to authenticate the credentials. In a further embodiment certain applications on the user equipment device may be automatically authorized or pre-authorized to utilize a communication tunnel so that it is not necessary for a subscriber profile repository to be queried as part of the entitlement validation. For example, a voice over wi-fi (VoWiFi) application residing on the user equipment device may be pre-authorized to create and use a communication tunnel, in which case the entitlement may be validated without querying the subscriber profile repository.

In a further embodiment, validating the data usage entitlement of the user equipment device may include evaluating an entitlement decision criterion based on one of content information, service information, traffic parameter information, subscription information, sponsor information, partner information, enterprise information, application information, location information, access network type information, contextual information, and signalling requirement information. In a further embodiment, selecting and assigning an available IP address from the plurality of IP address for using the requested service via the communication tunnel includes selecting the available IP address from a stateful repository of available and previously assigned IP addresses.

In a further embodiment, the method may include receiving by the processor a usage report for usage of the service via the communication tunnel from a tunnel termination function component, and using the received usage report to meter the usage of the requested service by the user equipment device. In a further embodiment, the method may include communicating with a charging system to update account balance information based on the received usage report. In an embodiment, the user equipment device may include an agent that is capable of metering usage that traverses a communication tunnel. This agent may be configured to transmit a report of the measured usage to the processor via a secure protocol. The usage reported by the device-based agent may be used in combination with the usage report from the tunnel termination function for reconciliation purposes, to identify discrepancies, for subscriber charging or billing or other related purposes.

Further embodiments include a non-transitory computer readable storage medium having stored thereon processor-executable software instructions configured to cause a processor of a service computing device (which may be deployed in a telecommunication network) to perform operations including receiving a service request message that includes information identifying a service to be used by a user equipment device, determining whether the requested service should be used by the user equipment device via a communication tunnel, sending a communication message to a policy management component to cause the policy management component to generate policy charging rules for the use of the requested service via the communication tunnel in response to determining that the requested service should be used by the user equipment device via the communication tunnel, selecting and assigning an available IP address from a plurality of IP address for using the requested service via the communication tunnel, and sending a service response message to the user equipment device to begin using the requested service via the communication tunnel.

In an embodiment, the stored processor-executable software instructions may be configured to cause a processor to perform operations such that determining whether the requested service should be used by the user equipment device via the communication tunnel includes querying a subscriber profile repository to receive subscription information, and using the subscription information to determine whether the requested service should be used by the user equipment device via the communication tunnel. In a further embodiment, the stored processor-executable software instructions may be configured to cause a processor to perform operations such that determining whether the requested service should be used by the user equipment device via the communication tunnel includes authenticating credentials included in the received service request message, and validating a data usage entitlement of the user equipment device. In a further embodiment, the stored processor-executable software instructions may be configured to cause a processor to perform operations such that authenticating the credentials included in the received service request message includes using a subscription identifier information (e.g., a MSISDN value, IMSI value, etc.) or UE device identification information (e.g., an international mobile station equipment identity (IMEI) value media access control (MAC) address value) and a framed IP address value included in the received service request message to authenticate the credentials.

In a further embodiment, the stored processor-executable software instructions may be configured to cause a processor to perform operations such that validating the data usage entitlement of the user equipment device includes evaluating an entitlement decision criterion based on one of content information, service information, traffic parameter information, subscription information, sponsor information, partner information, enterprise information, application information, location information, access network type information, contextual information, and signalling requirement information.

In a further embodiment, the stored processor-executable software instructions may be configured to cause a processor to perform operations such that selecting and assigning an available IP address from the plurality of IP address for using the requested service via the communication tunnel includes selecting the available IP address from a stateful repository of available and previously assigned IP addresses. In a further embodiment, the stored processor-executable software instructions may be configured to cause a processor to perform operations that further include receiving by the processor a usage report for usage of the service via the communication tunnel from a tunnel termination function component, and using the received usage report to meter the usage of the requested service by the user equipment device. In a further embodiment, the stored processor-executable software instructions may be configured to cause a processor to perform operations that further include communicating with a charging system to update account balance information based on the received usage report.

Further embodiments include a server computing device having a processor configured with processor-executable instructions to perform operations that include receiving a service request message that includes information identifying a service to be used by a user equipment device, determining whether the requested service should be used by the user equipment device via a communication tunnel, sending a communication message to a policy management component to cause the policy management component to generate policy charging rules for the use of the requested service via the communication tunnel in response to determining that the requested service should be used by the user equipment device via the communication tunnel, selecting and assigning an available IP address from a plurality of IP address for using the requested service via the communication tunnel, and sending a service response message to the user equipment device to begin using the requested service via the communication tunnel.

In an embodiment, the processor may be configured with processor-executable instructions to perform operations such that determining whether the requested service should be used by the user equipment device via the communication tunnel includes querying a subscriber profile repository to receive subscription information, and using the subscription information to determine whether the requested service should be used by the user equipment device via the communication tunnel.

In a further embodiment, the processor may be configured with processor-executable instructions to perform operations such that determining whether the requested service should be used by the user equipment device via the communication tunnel includes authenticating credentials included in the received service request message, and validating a data usage entitlement of the user equipment device by evaluating an entitlement decision criterion based on one of content information, service information, traffic parameter information, subscription information, sponsor information, partner information, enterprise information, application information, location information, access network type information, contextual information, and signalling requirement information. In a further embodiment, the processor may be configured with processor-executable instructions to perform operations further including receiving by the processor a usage report for usage of the service via the communication tunnel from a tunnel termination function component, using the received usage report to meter the usage of the requested service by the user equipment device, and communicating with a charging system to update account balance information based on the received usage report.

Further embodiments may include a server computing device having a processor configured with processor-executable instructions to perform operations corresponding to the method operations discussed above.

Further embodiments may include a server computing device having various means (e.g., a processor, memory, etc.) for performing functions corresponding to the method operations discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 7A through 7C are illustrations of information structures that may be generated, stored, maintained and used by an embodiment component to dynamically define, create, invoke and manage the delivery of services in accordance with various embodiments.

DESCRIPTION

Figure 1:
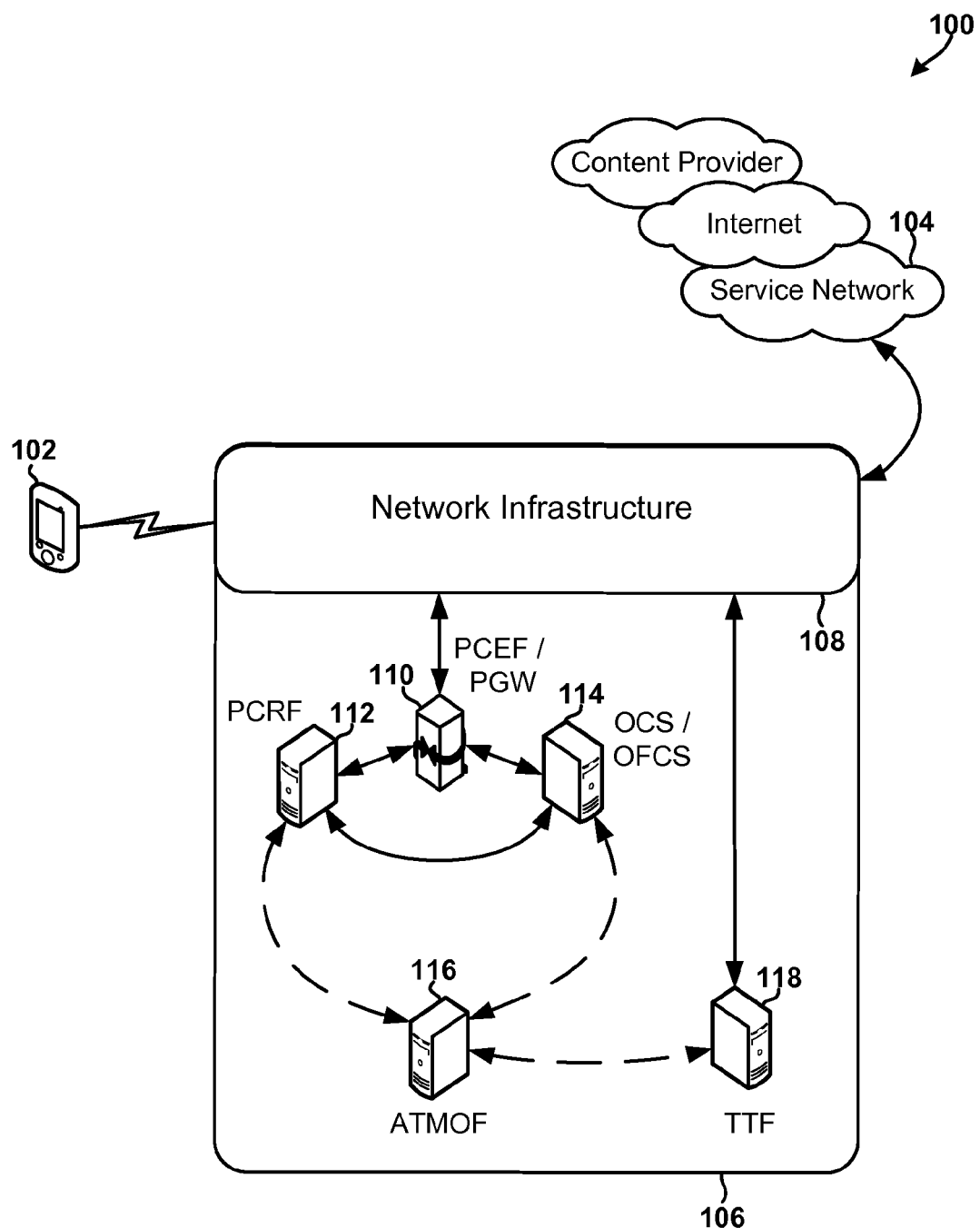
FIG. 1 is a system block diagram illustrating a telecommunication system suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

In overview, the various embodiments include methods, and network components (e.g., server computing devices, etc.) configured to implement the methods, of dynamically creating application-level tunnels within a telecommunication network for individual services or software applications, applying or implementing specific policy and/or charging rules (herein "policy charging rules") to specific tunnels, and coordinating, controlling, orchestrating and/or managing traffic flows through the tunnels. The network components may also be configured to perform improved metering, control and management operations.

By communicating with components in a telecommunication signaling network, the embodiment components may dynamically create communication tunnels and implement policy charging rules for specific tunnels. This allows the components (and telecommunication network operators) to implement improved bring-your-own-device (BYOD) capabilities, sponsored data models, and other technologies that require or include allocating all or portions of the responsibility for a user's use of a service or application to a third-party. The embodiment methods and components also allow a telecommunication network to dynamically and efficiently define, create or invoke services. In addition, the embodiment components allow telecommunication networks to implement advanced traffic treatment solutions (e.g., Guaranteed Bit Rate, etc.) for services and applications that do not fit a simple or pre-defined traffic profile. Thus, the embodiment methods and components enable additional functionality and improve the functioning of telecommunication systems and the computing devices that use services provided by the telecommunication system. For example, the embodiment components improve the functioning of the computing devices that use the services provided by the telecommunication network by improving data access times, reducing the amount of processing or battery resources required to receive/process complicated services, and allowing these computing devices to receive/use new types of services. Additional improvements to the functioning of the telecommunication system and computing devices will be evident from the disclosures below.

A number of different data tunneling communication technologies, protocols, standards, and techniques are available or contemplated in the future, any or all of which may be implemented, used, or supported by the various embodiments. For example, an embodiment component may be configured to implement, use, or support any or all of the Internet protocol security (IPsec) protocol suite, layer-2 tunneling protocol (L2TP), generic routing encapsulation (GRE), SOCKS, secure shell (SSH), secure socket tunneling protocol (SSTP), Internet control message protocol (ICMP) tunnels, virtual private network (VPN) tunnels, or any other similar tunneling or tunnel-related technology, protocol, standard, or technique known in the art.

As used in this application, the terms "component," "module," "node," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, a computing device, and/or a computing system.

The terms "user device," "wireless device" and "user equipment (UE)" may be used interchangeably and refer to any one of various cellular telephones, smart-phones (e.g., iPhone®), personal data assistants (PDA's), palm-top computers, tablet computers, laptop computers, wireless electronic mail receivers (e.g., Blackberry®), VoIP phones, wire-line devices, devices implementing Machine-to-Machine (M2M) technologies, multimedia/Internet enabled cellular telephones, and similar electronic devices capable of sending and receiving wireless communication signals. A user device may include a memory and a programmable processor or processing core. In a preferred embodiment, the user device is a cellular handheld device (e.g., a mobile device), which can communicate via a cellular telephone communications network.

A number of different cellular, mobile, Wi-Fi, fixed-line, cable, and satellite communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunication system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunication (DECT), Worldwide Interoperability for Microwave Access (WiMAX), wireless local area network (WLAN), Wi-Fi Protected Access I & II (WPA, WPA2), integrated digital enhanced network (iden), Data Over Cable Service Interface Specification (DOCSIS), PacketCable, DSL, Broadband Forum, Metro Ethernet Forum, Wireless Broadband Alliance and various other fixed and mobile communications networks. Each of these technologies involves, for example, the transmission and reception of signaling, usage reports and content messages. It should be understood that any references to terminology and/or technical details related to an individual standard or technology are for illustrative purposes only, and are not intended to limit the scope of the claims to a particular communication system or technology unless specifically recited in the claim language.

To focus the discussion on the relevant features and functionalities, the various embodiments may be described with reference to specific architectures and components of a 3GPP mobile network. However, all references to terminology and/or technical details related to an individual standard or technology are for illustrative purposes only, and are not intended to limit the scope of the claims to a particular communication system, technology, architecture, or component unless specifically recited in the claim language.

Generally, a tunnel is a logical connection or communication link between a source component and a destination component that allows these components to communicate information (e.g., data and signaling information) across the underlying network and through intermediate components. A tunnel may allow the source and destination components to communicate independent of the technologies or protocols used or supported by the underlying network or components. This may be accomplished, for example, by encoding the information into packets that use a first protocol, encapsulating these packets into the payload portions of other packets that use a second protocol (e.g., a protocol supported by the network), and transmitting the encapsulating packets so that information included in the header portions of the encapsulating packets are used to make routing decisions. This creates a "tunnel" through which the encapsulated packets travel "directly" from the source component to the destination component, without being exposed to, or requiring any special control by, an intermediate component.

Conventional tunnels are used to communicate information over networks and/or to create a secure path through an unsecured or untrusted network over which the information may be communicated. Unlike conventional solutions, the various embodiment components create and use tunnels so as to implement different policy charging rules for the use of different services or software applications by the same user device. Also unlike conventional solutions, the various embodiment components create tunnels dynamically and for individual services (e.g., voice-over-IP, voice and video call, video-on-demand, etc.) or software applications.

In particular, the various embodiments include network components (e.g., server computing devices, etc.) configured to dynamically create application-level tunnels for individual services or software applications (herein collectively "services"), apply or implement specific policy charging rules to specific tunnels, and to coordinate, control, orchestrate and/or manage traffic flows through these dynamically created tunnels. By dynamically creating tunnels for individual services and applying specific policy charging rules to specific tunnels, the various embodiments allow telecommunication networks to better implement bring-your-own-device (BYOD) capabilities, sponsored data models/solutions, and other technologies or solutions that benefit from special traffic treatment or which include or require allocating all or portions of the responsibility for a user's use of a service/application to a third-party.

Generally, the term "bring your own device" or "BYOD" refers to a corporate policy that permits individuals to use their privately-owned user devices (PCs, laptops, tablets, smart phones) for both personal and work-related activities. As such, BYOD solutions should allocate responsibility for a user's use of a work-related service (e.g., video conferencing, etc.) to the corporation, and charge the user for only the services used for personal reasons (e.g., checking stocks, reading the news, watching sports, etc.). Yet, many conventional BYOD solutions are unable to adequately differentiate between the services used for personal reasons and those used for work-related activities. Other conventional BYOD solutions differentiate between such services by marking data packets as they pass through the gateway. However, marking data packets is an expensive, laborious and sometimes inaccurate process, and often has a negative impact on the performance characteristics of the service, user device and/or telecommunication network. For all these reasons, conventional solutions are not adequate for implementing BYOD or sponsored data solutions.

The various embodiment components overcome the above-mentioned limitations of existing solutions, and may be used to implement BYOD and sponsored data solutions that do not have a significant negative impact on the accuracy or performance of the service, user device or telecommunication network. That is, unlike conventional solutions, the embodiment components may be configured to apply a first set of policy charging rules a service used for personal activities and to apply a second set of policy charging rules to a service used for business (or to other sponsored activities), without marking individual data packets. In an embodiment, this may be accomplished by creating a communication tunnel (or a partial tunnel) for the service that is used for business purposes. This allows a first (or default) set of policy charging rules to be applied to data that is consumed, used, or communicated outside of the tunnel (e.g., for personal usage), and for a second set of policy charging rules to be applied to data that is consumed, used, or communicated via the communication tunnel (e.g., for business usage). The first (or default) set of policy charging rules may cause the system to charge (e.g., deduct usage credits from) the user's private account and/or provide a level of quality of service (QoS) that is commensurate with the user's private or personal subscription plan for information that is communicated outside of a tunnel. On the other hand, the second set of policy charging rules may cause the system to charge the corporate account and/or provide a level of QoS that is commensurate with the corporation's subscription plan for information communicated via the tunnel.

The embodiment described in the preceding paragraph allows the telecommunication network to implement a default set of policy charging rules for data that is communicated outside of a tunnel, and another set of policy charging rules for data that is communicated via a tunnel. In another embodiment, the network components may be configured to create tunnels for both personal and business uses, and implement different policy charging rules for each tunnel. For example, the network components may create a first tunnel for a first service that is used for personal reasons (e.g., voice, web browser, Facebook®, SMS, etc.), and a second tunnel for a second service that is used for business or other sponsored activities (e.g., a video conferencing, etc.). The network components may then implement the first set of policy charging rules for the first tunnel, and the second set of policy charging rules for the second tunnel.

By dynamically creating tunnels and applying specific policy charging rules to specific tunnels, the various embodiments allow the telecommunication network to implement improved bring your own device (BYOD) capabilities and solutions. For the same or similar reasons, the network components also allow the telecommunication network to provide improved sponsored data solutions.

Generally, sponsored data solutions allow a telecommunication network operator's third-party partner to "sponsor" or pay for some or all of a user's consumption of a service. Such solutions are growing in popularity because many users now primarily access online content via their user devices and the telecommunication network (e.g., 3G, 4G, LTE, etc.), and many of today's subscription plans charge/bill the consumer based on the amount of data used in a billing period (e.g., per month, etc.). Since network usage charges may accumulate rapidly, users are reluctant to use bandwidth heavy applications/sites (e.g., YouTube®, Netflix®, ESPN®, etc.) on their user devices. Due to these trends, many of today's bandwidth heavy applications/sites are beginning to experience a loss or reduction in customer traffic. This loss or reduction in customer traffic may a significant negative impact on the total amount of revenue that these sites/applications generate (i.e., due to loss in advertising revenues).

To address these issues, telecommunication network operators have begun offering sponsored data solutions that 'whitelist' select services so that users are not charged for the use of a whitelisted service (i.e., the usage of the service is not counted towards the user's data entitlement/allowance for the month, etc.). Rather, the responsibility for the use of these services is shifted to a third party sponsor, such as the owner of the site, content provider, advertiser, application publisher, etc. Yet, many conventional sponsored data solutions do not adequately shift the responsibility for the use of a service to a third party sponsor, require marking the packets or performing other complex, inefficient or laborious operations, or otherwise have a significant negative impact on the performance characteristics of the service, user device or telecommunication network.

The various embodiments improve upon existing sponsored data solutions by creating communication tunnels for individual services and applying specific policy charging rules to specific tunnels. This allows the network to efficiently allocate responsibility for the use of a specific service by a specific user to a specific third party sponsor. This also allows a single user device to use multiple services that are each sponsored by different third party sponsor.

An embodiment network component may be configured to dynamically create, for a specific user device, a first tunnel for a first whitelisted service (e.g., Netflix®) and a second tunnel for second whitelisted service (e.g., ESPN®). The network component may then apply a first set of policy charging rules for the first tunnel and a second set of policy charging rules for the second tunnel. The first set of policy charging rules may cause the network to charge a first third-party sponsor for the use of the first service (or provide a QoS commensurate with the first third party sponsor's partnering agreement or subscription plan), the second set of policy charging rules may cause the network charge the second third-party sponsor for the use of the second service, and so on. Data consumed, used or communicated outside of any sponsored tunnel (e.g., or by using a default or conventional solution) may be charged to the user's personal or private account.

The various embodiment components also allow telecommunication networks to offer their customers more advanced or complicated traffic treatment solutions (e.g., guaranteed bit rate solutions, etc.), such as for services that do not fit a simple or pre-defined traffic profile. The various embodiments also improve the functioning of a telecommunication network for a variety of additional reasons that are evident from the disclosures below.

Currently, if a third-party wishes to sponsor a user service (e.g., Netflix, SalesForce.com, Skype) it must know, in advance, the TCP/IP end-points for each service. Yet, many of these services are delivered via a Content Delivery Network (CDN) and/or a scalable cloud where the ultimate source and destination IP addresses cannot necessarily be pre-determined since they are geographically dispersed and/or selected based on changing user, location, load, and network conditions. Also, in the case of video content, the source IP address may change dynamically as the serving node may change/switch during playback. In addition, a single service may invoke traffic from multiple servers. For example, an HTTP GET request from Facebook.com may actually pull content from twenty separate servers. In this scenario, the operator's Policy and Charging Controls (PCC) Traffic Flow Templates (TFT) would have to be updated with information for each of these servers and there are many static PCC rules that must be pre-defined for every application and service.

In such an environment/network, it is difficult to apply PCC controls (e.g., policy charging rules) to certain services because they require complex Traffic Flow Templates that can also change in mid-session (e.g., when a video content server changes a serving cache node, etc.), involve one or more servers whose TCP/IP address cannot be pre-determined in advance (e.g., when the content or service is hosted on a CDN or cloud, etc.), and/or are required to support a single service that may dynamically re-direct the client to multiple other services (e.g., a web page with embedded content hosted on other servers). For these and other reasons, conventional solutions do not adequately allow services to be dynamically and efficiently defined, created, or invoked. Conventional solutions are also not adequate for identifying and managing complex traffic profiles, do not adequately manage billing responsibilities and traffic treatments, or are otherwise slow, cumbersome, complex, inefficient or inaccurate.

Various embodiments include network components configured to overcome the above-mentioned limitations of conventional solutions. For example, by authorizing and creating a communication tunnel so as to allow policy charging rules to be applied to a portion or segment of the communication link or data flow between user equipment device and a destination component (i.e., the segment between a UE device and a tunnel termination function component), the various embodiment components allow services to be dynamically defined, created, or invoked without requiring advanced knowledge of the specific destination TCP/IP end-points for each service or application.

The embodiment components may also be configured to efficiently identify and manage complex traffic profiles that do not fit a simple or pre-defined traffic profile.

The embodiment components may also be configured to orchestrate and manage Traffic Flow Templates for individual services or applications.

The embodiment components may also be configured to accurately manage billing responsibilities and traffic treatments.

The embodiment components may also be configured to reduce the complexity associated with allocating responsibility for a user's use of a service to a third-party.

For all the forgoing reasons, the inclusion and use of an embodiment network component in a telecommunication network may improve the speed, efficiency, and accuracy of the telecommunication network and the computing devices that use the services provided by the telecommunication network.

The various embodiments may be implemented within a variety of communication systems, an example of which is illustrated in FIG. 1. A typical communication system 100 includes user equipment 102 device configured to send and receive voice, data, and control signals to and from a service network 104 (and ultimately the Internet and/or a content provider) via a communications network 106.

In the example illustrated in FIG. 1, the communications network 106 includes a network infrastructure 108 unit that encapsulates various network components/systems, each of which may implement any of a variety of communication technologies/protocols to process and route the voice, data and control signals to and from the UE 102 device. For example, the network infrastructure 108 unit may include components for implementing a cellular telephone network, a radio access network (e.g., UTRAN, RAN, etc.), Wi-Fi network, WiMAX network, and/or other well known communication technologies (e.g., GPRS, UMTS, LTE, cdmaOne, CDMA2000™). Since these structures are well known, certain details have been omitted in order to focus the descriptions on the most relevant features.

The network infrastructure 108 unit may include connections to a policy and charging enforcement function (PCEF) component 110, which may be responsible for enforcing policy rules to control the bandwidth, the quality of service (QoS), and other characteristics of the communications between the service network 104 and the UE 102 device. The enforcement of policies may also include querying, coordinating, removing, revoking and/or adjusting various resources (e.g., network resources, subscriber resources, etc.) based on the policy rules. In the various embodiments, the PCEF component 110 may be a part of, or perform operations typically associated with, a gateway GPRS support node (GGSN), a packet data network gateway (PGW), or other similar components.

The PCEF component 110 may also be configured to send signaling information (e.g., control plane information relating to communication setup, security, authentication, charging, enforcement of policy rules, etc.) to a policy and charging rules function (PCRF) component 112, online/offline charging systems (OCS/OFCS) 114, and other similar components that participate in, collect information from, or otherwise contribute to, communications between the service network 104 and the UE 102 device. Since many of these structures/components are well known, certain details have been omitted in order to focus the descriptions on the most relevant features.

In addition to the components mentioned above, an embodiment communications network 106 may include an application tunnel management and orchestration function (ATMOF) component 116. The ATMOF component 116 may be configured with processor-executable instructions to perform operations for dynamically creating tunnels (e.g., for telecommunication services that have complex usage patterns) and metering services that cannot otherwise be metered without very complex Traffic Flow Templates (TFT) and PCC rules. The ATMOF component 116 may be configured to communicate with the UE 102 device, a tunnel termination function (TTF) component 118, PCEF component 110, PCRF component 112 and/or the OCS/OFCS component 114. In an embodiment, data and user traffic of interest (i.e., data that traverses the tunnel to be measured, treated, etc.) flows through both the PCEF component 110 and the TTF component 118. Additional details on the operations of the ATMOF and TTF components 116, 118 are provided further below.

Figure 2:
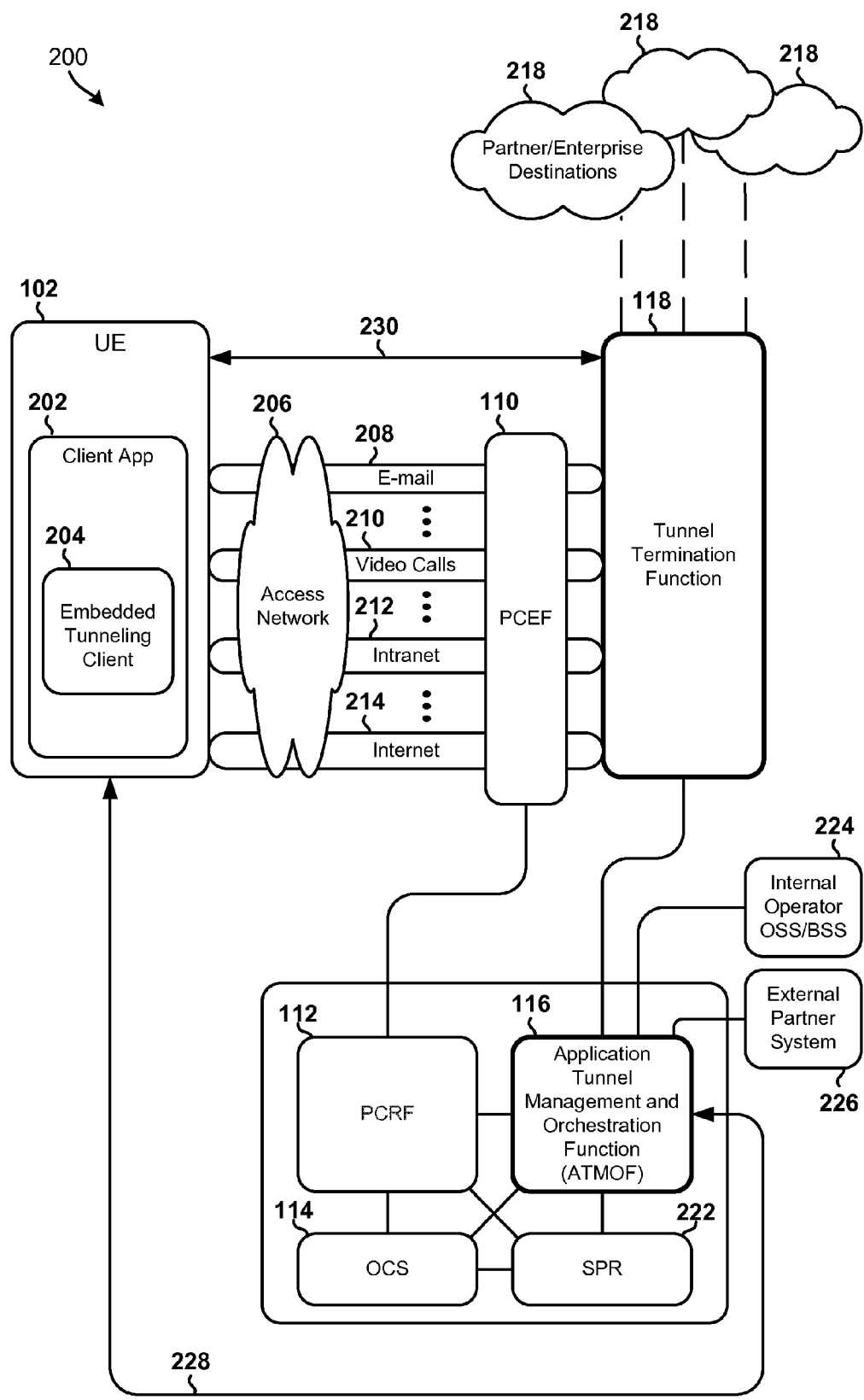
FIG. 2 is an architectural diagram illustrating various components and information flows in a system configured to dynamically create tunnels and apply policy charging rules to the dynamically created tunnels in accordance with the various embodiments.

FIG. 2 illustrates network components in an embodiment system 200 configured to dynamically authorize/create tunnels and apply policy charging rules to the tunnels. The system 200 may include a user equipment (UE) 102 device, a tunnel termination function (TTF) component 118, and an application tunnel management and orchestration function (ATMOF) component 116. The UE 102 device may include a client application 202 that includes an embedded tunneling client component 204. Each of the components 116-204 may be implemented in software, hardware, or any combination thereof. In an embodiment, one or more of the components 116-204 may be implemented as processor-executable software instructions executing on one or more processors or processing cores of a computing device, such as on a processing core of a server computing device, a processing core of the UE 102 device, etc.

The embedded tunneling client component 204, TTF component 118 and ATMOF component 116 may be configured to communicate to dynamically create or generate one or more tunnels 208-214. A tunnel 208-214 may be created or generated for each client application 202 that includes an embedded tunneling client 204. Each of the tunnels 208-214 may be specific to a service or application. In the example illustrated in FIG. 2, the UE 102 creates (e.g., via one or more embedded tunneling clients 204, the TTF component 118, and the ATMOF component 116) an email tunnel 208, a video call tunnel 210, an intranet tunnel 212, and an Internet tunnel 214. The tunnels 208-214 may extend from the UE 102 to the TTF component 118, and the TTF component 118 may be responsible for routing the information that is received via the tunnels 208-214 to the partner/enterprise destinations 218. As such, the tunnels 208-214 may be partial tunnels that "tunnel" a portion or segment of the communications between the UE 102 and the partner/enterprise destination 218. In an embodiment, one or more of the tunnels 208-214 may be a VPN tunnel. In an embodiment, the UE 102 may be connected to an alternate service provider's access network 206 or partner network 218, in which case the ATMOF 116 and TTF 118 components may be also be accessible to the UE 102 via the Public Internet.

In an embodiment, the UE 102 device may also include an agent (not illustrated in FIG. 2) that is configured to meter usage that traverses a communication tunnel. This agent may transmit a report of the measured usage to the processor via a secure protocol. The usage reported by the device-based agent may be used in combination with the usage report from the TTF component 118 for reconciliation purposes, to identify discrepancies, for subscriber charging or billing or other related purposes.

In addition to the components discussed above, the system 200 may also include access network 206 components, a PCEF component 110, a PCRF component 112, an OCS component 114, a subscriber profile repository component 222, an internal operator operations support system (OSS)/business support systems (BSS) component 224 and an external partner system 226. The access network 206 components may be configured to facilitate communications between the UE 102 and partner or enterprise destinations 218. The access network 206 may serve as the primary point of entry and exit of wireless device traffic, and connect the UE 102 device to its immediate service provider and/or packet data networks (PDNs). The access network 206 may also route control information to a policy and charging control (PCC) network, which may be a part of an implementation of an evolved packet core (EPC)/long term evolution (LTE) architecture and include the PCEF component 110. In various embodiments, the access network 206 may include one or more of a controller, a gateway, a serving gateway (SGW), a packet data network gateway (PGW), an evolved packet data gateway (ePDG), a packet data serving node (PDSN), a serving general packet radio service support node (SGSN), or any combination of the features/functions provided thereof. Since these structures are well known, certain details have been omitted in order to focus the descriptions on the most relevant features.

The ATMOF component 116 may also communicate with various network components, including the PCRF component 112, the OCS component 114, the SPR component 222, internal operator OSS/BSS component 224, and external partner system 226. For example, the ATMOF component 116 may be configured to request subscriber profile information from the SPR component 222 (which is generally responsible for storing and maintaining subscriber profile information, such as customer IDs, preferences, subscription levels, etc.), request policy information from the PCRF component 112, request charging information from OCS component 114, etc. In the various embodiments, the ATMOF component 116 may be configured to request, receive, and use any information stored by or available to the network components to authenticate, validate, certify, or authorize the UE 102, client application 202, embedded tunneling client component 204, or the creation or use of the tunnels 208-214. In an embodiment, ATMOF component 116 may reside within an alternate service provider's access network 206 or partner network 218, and be connected to the alternate service provider's PCRF component 112, OCS component 114, SPR component 222, and internal operator OSS/BSS component 224 through external partner system 226.

The ATMOF component 116 may also be configured to send a policy request message to the PCRF component 112 to cause the PCRF component 112 to generate policy rules for a specific tunnel 208-214. The PCRF component 112 may be configured with processor-executable instructions to receive the policy request message from the ATMOF component 116, request/receive charging information from the OCS component 114, use the charging information to make policy decisions, generate policy charging rules, send the generated rules to the PCEF component 110 for enforcement on one or more of the tunnels 208-214, and send a policy response message to ATMOF component 116. The ATMOF component 116 may be configured receive and use the information in the policy response message to ensure that the generated/applies policy charging rules are sufficient to provide the UE 102 device with a quality of service (QoS) that is commensurate with the requirements of the service, to ensure that the correct entity is charged for the use of the service, and/or to perform other similar management operations.

In an embodiment, the ATMOF component 116 may be configured to communicate/interact with one or more Network Function Virtualization (NFV) Orchestrator components (not illustrated) so as to allow for the integration of network and other operator resources to create a service chain for the delivery of virtualized services. The ATMOF component 116 and NFV Orchestrator may operate collaboratively to configure, coordinate and direct virtual resources to satisfy services requests and meet customers' service level agreements. In an embodiment, the NFV Orchestrator may be included in the ATMOF component 116.

In an embodiment, the ATMOF component 116 may interact with one or more Software-Defined Networking (SDN) Controller components (not illustrated) so as to manage the flows and switching of traffic related to tunneled services and applications managed by the ATMOF component 116.

In an embodiment, the UE 102 may communicate directly with the ATMOF component 116 via a communication link 228, such as to request validation or the creation of a tunnel. The UE 102 may also communicate directly with the TTF component 118 via a communication link 230 to exchange certificates and other information.

Figure 3:
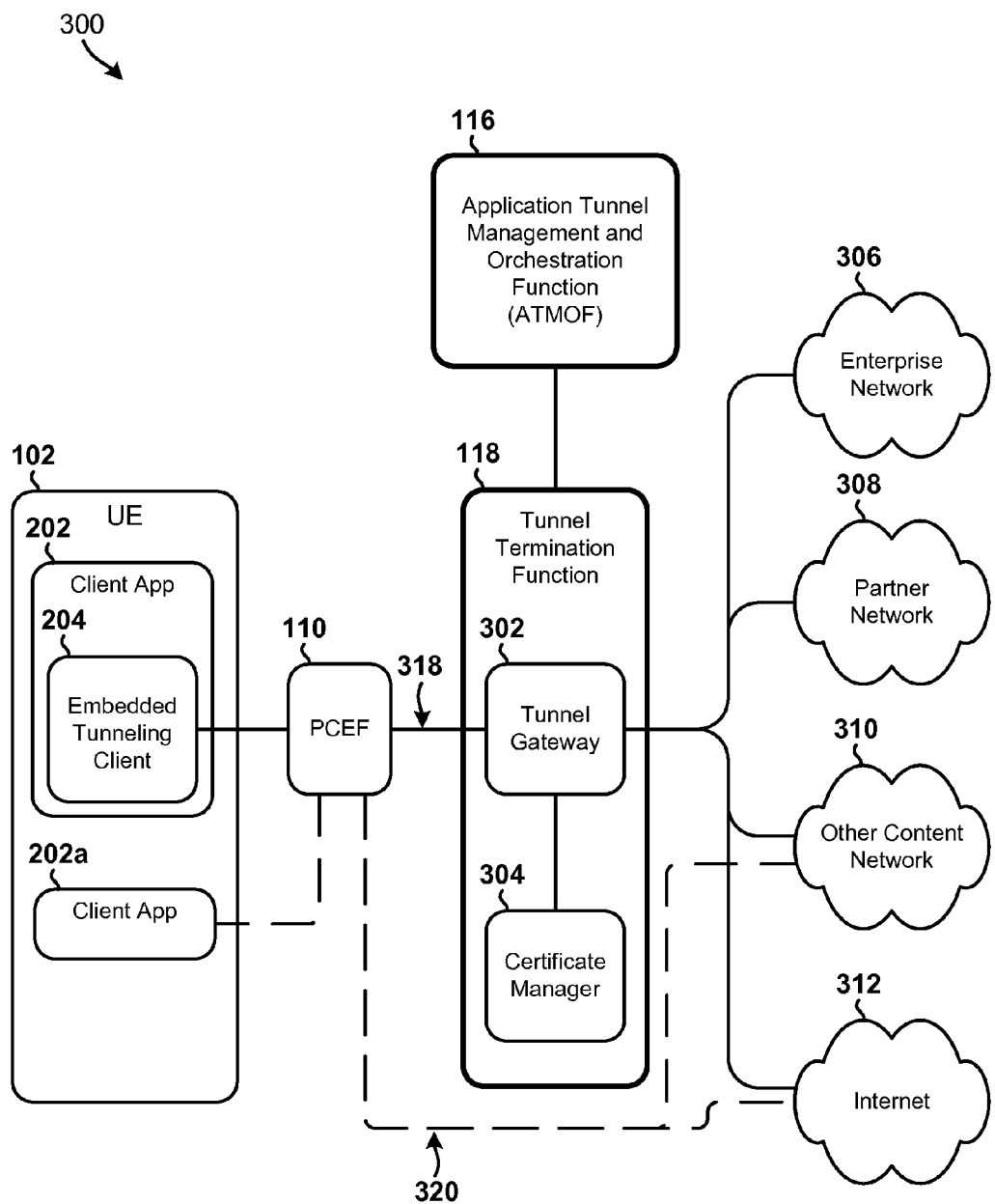
FIG. 3 is an architectural diagram illustrating additional network components in a system configured to dynamically create tunnels and apply policy charging rules to the dynamically created tunnels in accordance with the various embodiments.

FIG. 3 illustrates additional network components that may be included in a system 300 suitable for dynamically creating tunnels and apply policy charging rules to the tunnels in accordance with various embodiments. In particular, FIG. 3 illustrates that the TTF component 118 may include a tunnel gateway component 302 and a certificate manager component 304.

The tunnel gateway component 302 may be configured to establish and maintain one or more tunnels 318 (e.g., tunnels 208-214 illustrated in FIG. 2) to the embedded tunneling client 204 via the PCEF component 110. The tunnel gateway component 302 may also establish communication links to components in various network destinations 306-312, such as the illustrated enterprise network 306, partner network 308, other content network 310, and Internet 312.

Client applications 202 that include an embedded tunneling client 204 may request the creation of one or more tunnels and/or may send and receive information to and from the network destinations 306-312 via one or more of the tunnels 318 (if needed). On the other hand, client applications 202a that do not include a tunneling client may communicate information using conventional solutions and/or via conventional communication links 320.

The certificate manager component 304 may be configured to generate and verify the certificates required to authorize, authenticate, verify, initiate or establish a tunnel 318. As part of these operations, the certificate manager component 304 may exchange certificates with embedded tunneling client 204, the ATMOF component 116, and other components (e.g., the internal operator OSS/BSS component 224, external partner system 226, a network operator system, a third-party component, etc.) The certificate manager component 304 may also be configured to request verification of the previously determined entitlement from the ATMOF component 116, authenticate the UE client application 202, and perform other similar operations.

Figure 4:
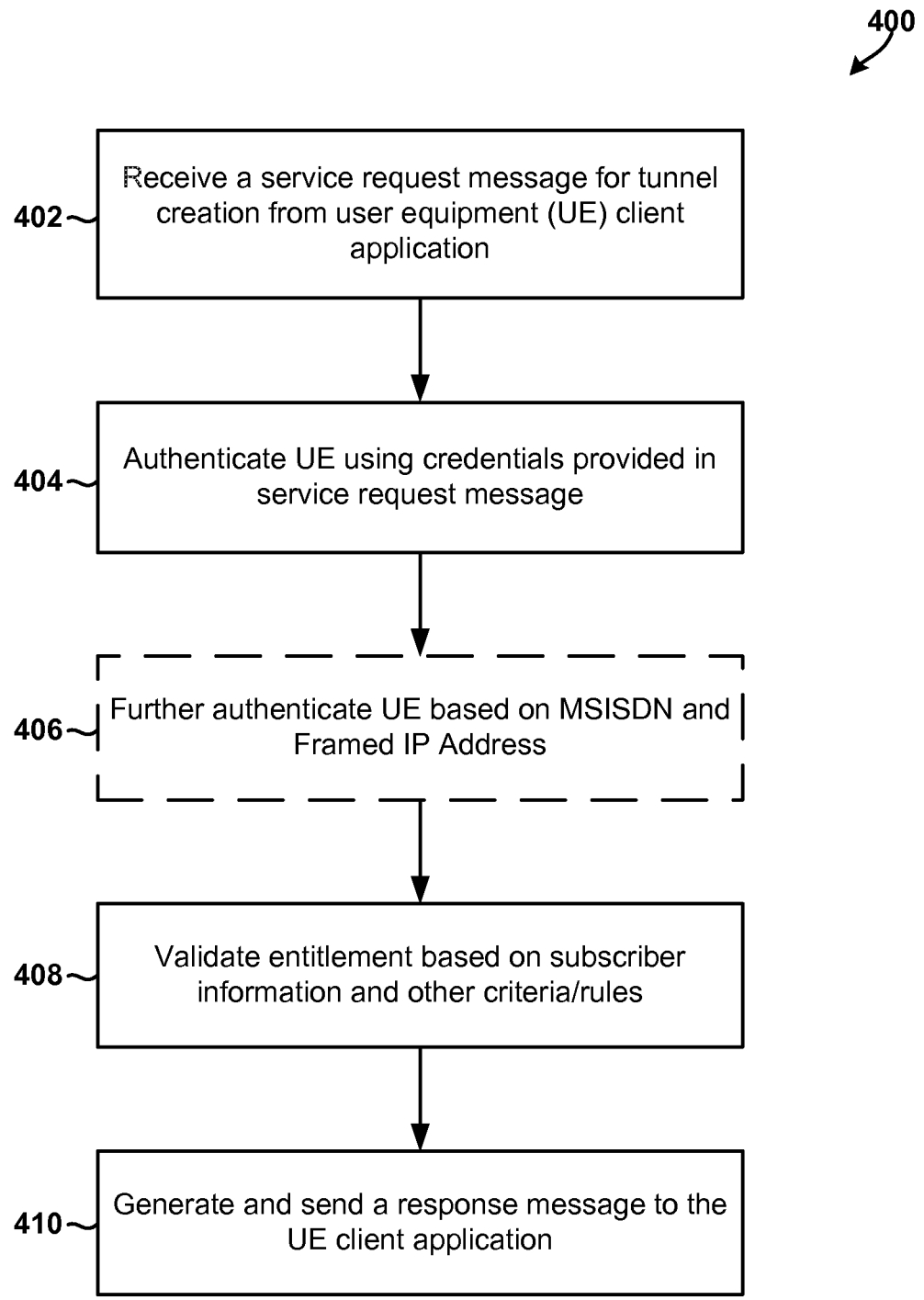
FIG. 4 is a process flow diagram illustrating a method for authenticating a user equipment device to receive a service via a communication tunnel in accordance with an embodiment.

FIG. 4 illustrates a method 400 for authenticating a user equipment device for establishing a tunnel for a service/application in accordance with an embodiment. Method 400 may be performed by a processing core in a computing device that includes or implements all or portions of the ATMOF component 116. In block 402, the processing core may receive a service request message for tunnel creation from a user equipment device (or a tunneling client embedded in a client application of the user equipment device). The service request message may include credentials or other information suitable for authenticating the user equipment device, user/subscriber identifier or key, client application or service. In an embodiment, the service request message may also include subscription identifier information (e.g., a MSISDN value, an IMSI value, etc.) or UE device identification information (e.g., an international mobile station equipment identity (IMEI) value media access control (MAC) address value) and a framed IP address value.

In block 404, the processing core may use the information included in the service request message to authenticate the user equipment device, which may be accomplished via any of a variety of standard telecommunication authentication techniques. In optional block 406, the processing core may further authenticate the user equipment device based on but not limited to network and interface identifiers such as the MSISDN value or framed IP address value included in the service request message or obtained via conventional solutions.

In block 408, the processing core may validate the entitlement (i.e., the user's, UE's, or application's authorization to create and use a tunnel) based on subscriber information and other rules/criteria. As part of these operations, the processing core may request and receive information from a policy management system (e.g., PCRF component 112), a charging system (e.g., OCS component 114), a subscriber profile manager (e.g., SPR component 222) and/or other similar network components. For example, the processing core may request/receive subscriber profile information from a SPR component 222 and charging information from the OCS component 114, and use this information to determine whether the subscriber has sufficient access credits to use the requested service. In response to validating the entitlement, in block 410, the processing core may generate and send a service request response message to the user equipment device (or its client application). The user equipment device may receive and use this information to establish (or to initiate the establishment of) a new tunnel for the client application or service.

Figure 5:
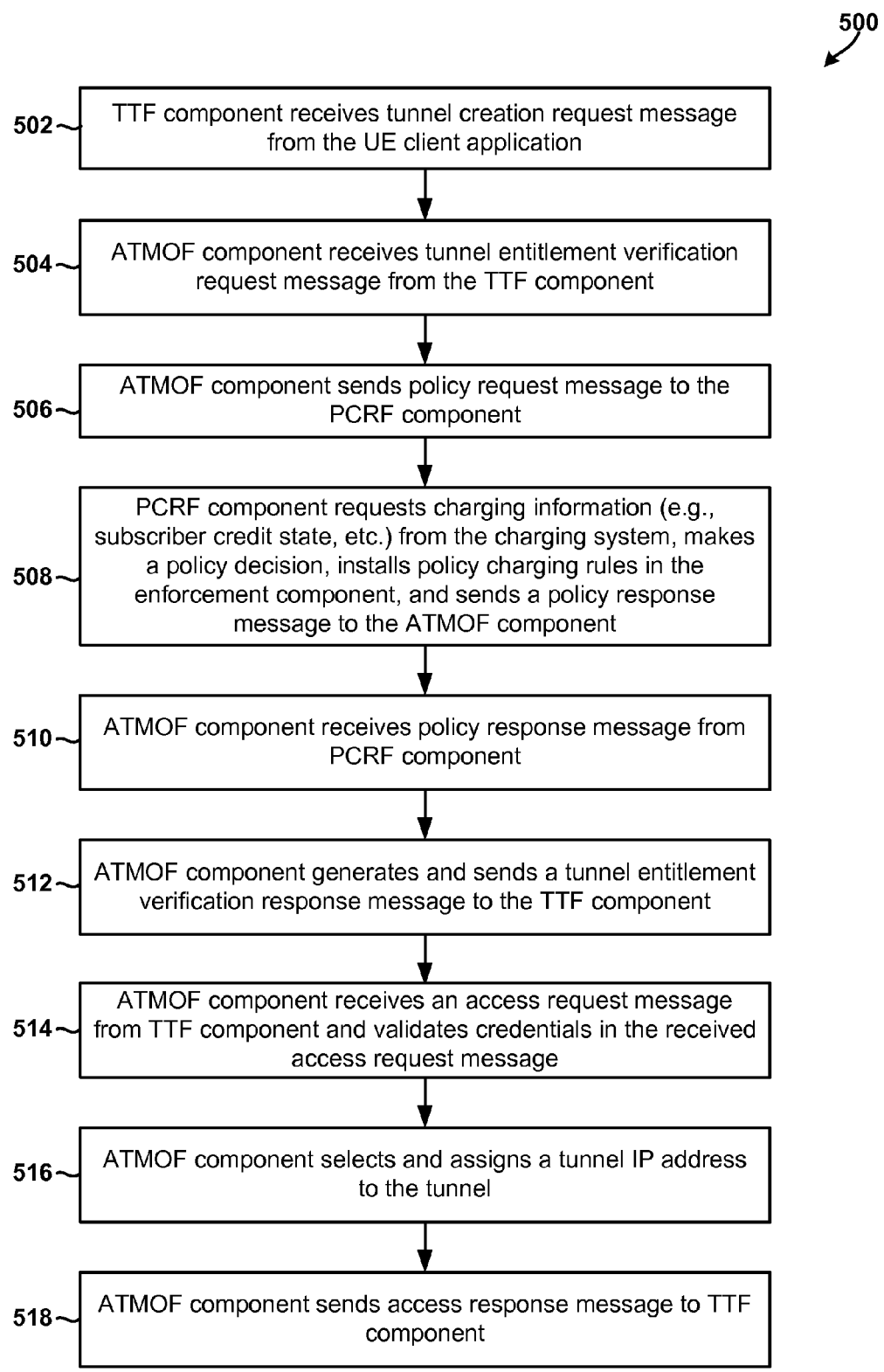
FIG. 5 is a process flow diagram illustrating a method for authorizing the creation, generation or establishment of a tunnel for a service in accordance with an embodiment.

FIG. 5 illustrates a system method 500 for authorizing the creation, generation, or establishment of a tunnel for a service in accordance with an embodiment. Method 500 may be performed by the processing cores of computing devices that implement or include all or portions of the TTF component 118, ATMOF component 116, and PCRF component 112.

In block 502, processing core of the TTF component 118 may receive a tunnel creation request message from a UE client application 202, and in response, generate and send a tunnel entitlement verification request message to the ATMOF component 116. In block 504, the processing core of the ATMOF component 116 may receive the tunnel entitlement verification request message from the TTF component. The ATMOF component 116 may generate and send a policy request message to the PCRF component in block 506.

In block 508, the processing core of the PCRF component 112 may receive the policy request message, and in response, request charging information (e.g., subscriber credit state, etc.) from the charging system (e.g., OCS component 114), make a policy decision, install policy charging rules in the enforcement component (e.g., PCEF component 110), and send a policy response message to ATMOF component 116.

In block 510, the ATMOF component 116 may receive a policy response message from PCRF component 112. In block 512, the ATMOF component 116 may generate and send a tunnel entitlement verification response message to the TTF component 118. In block 514, the ATMOF component 116 may receive an access request message from TTF component, and validate the user, user device or service based on the credential information included in the received access request message. In block 516, the ATMOF component 116 may select and assign a tunnel IP address to the tunnel. In block 518, the ATMOF component 116 may send an access response message to TTF component.

Figure 6:
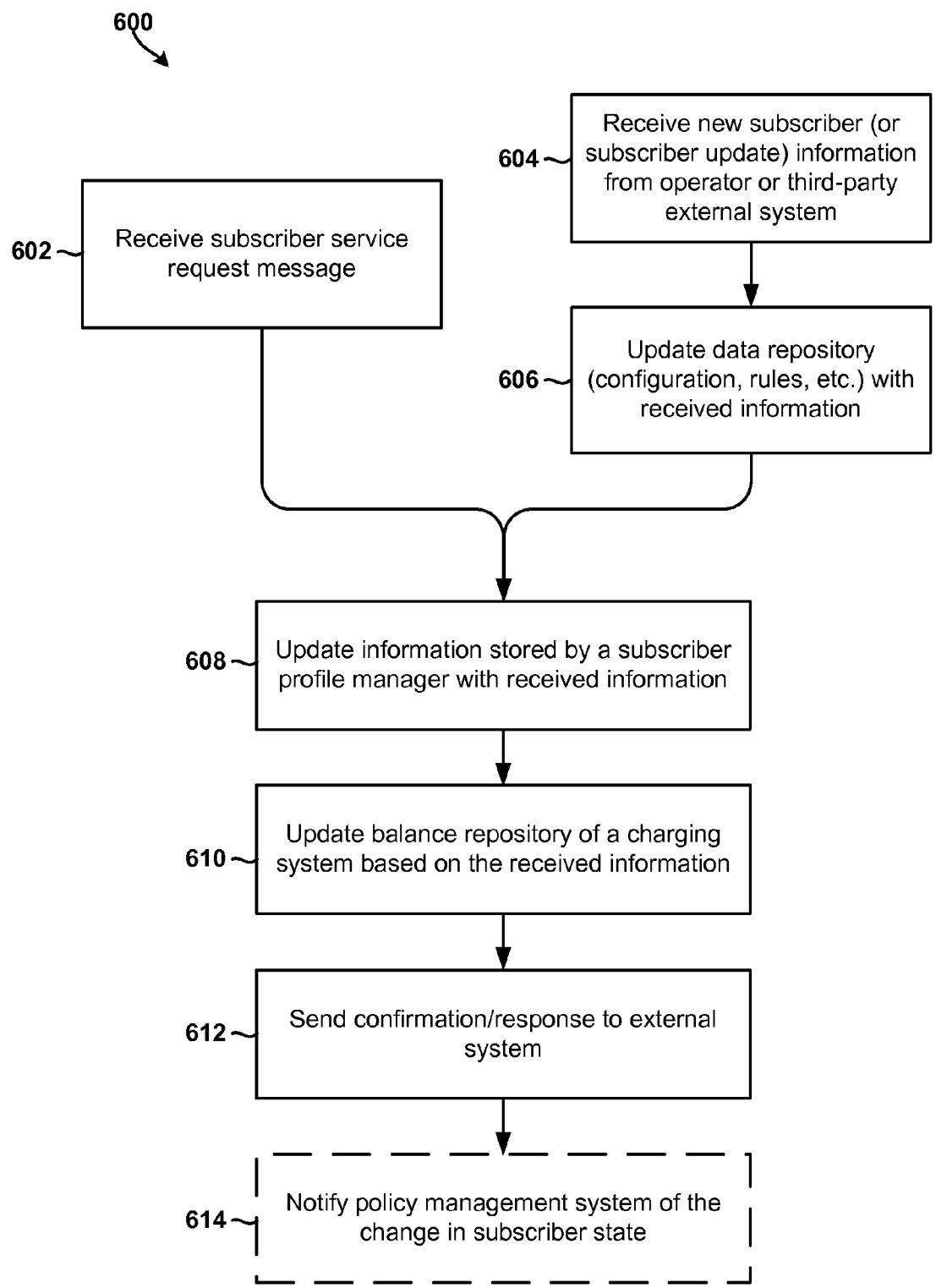
FIG. 6 is a process flow diagram illustrating a method for monitoring and managing the usage of services via a tunnel in accordance with an embodiment.

FIG. 6 illustrates a method 600 for monitoring and managing the usage of services via a tunnel in accordance with an embodiment. Method 600 may be performed by a processing core of computing device that implements or includes all or portions of an ATMOF component 116.

In block 602, the processing core may receive a subscriber service request message. Alternatively, in block 604, the processing core may receive new subscriber information or subscriber update information from a telecommunication network server (e.g., via internal operator OSS/BSS component 224 illustrated in FIG. 2) or a third-party external system (e.g., via external partner system 226 illustrated in FIG. 2). The processing core may use the received information to update data repository information (configuration, rules, etc.) stored or maintained by the ATMOF component 116 in block 606.

In block 608, the processing core may use the received information to update the information stored by a subscriber profile manager (e.g., SPR component 222). In block 610, the processing core may use the received information to update balance information stored by the relevant charging system (e.g., OCS component 114). In block 612, the processing core may send a confirmation or response message to the external system (e.g., the external partner system 226, etc.). In optional block 614, the processing core may notify the policy management system (e.g., PCRF component 112) of the change in subscriber state.

FIGS. 7A-7C illustrate information structures 702-706 that may be generated, stored, maintained, and used by the ATMOF component 116 to dynamically define, create, invoke, and manage the delivery of services via tunnels in accordance with various embodiments. In particular, FIG. 7A illustrates an information structure 702 that may be used for services or applications that do not include an embedded tunneling client (or which do not require a tunnel). FIGS. 7B and 7C illustrate information structures 704, 706 that may be used for the delivery of services via tunnels in accordance with various embodiments.

In the example illustrated in FIG. 7B, the information structure 704 stores stateful session information and exposes additional mappings for each tunnel. Each tunnel may carry traffic associated with a specific type of service, such as instant messaging (IM), web browsing (WEB) and video applications.

FIG. 7C illustrates that the ATMOF component 116 may establish and manage tunnels for very specific and fine-grained traffic flows, such as a tunnel (e.g., Tunnel_VIDEO_

STREAM1) for a first steaming application (e.g., Netflix®) and another tunnel (e.g., Tunnel_VIDEO_STREAM2) for a second streaming application (e.g., Hulu®). Each tunnel may carry traffic associated with a specific service (e.g., Netflix®, Hulu®, etc.). In addition, a single tunnel may support flows for multiple services by using the same IP address, such as 172.2.3.43 for both Tunnel_VIDEO_CORP and Tunnel_VIDEO_CONF_CORP. Further, each tunnel may ride on a different bearer, which may be a default bearer or a dedicated bearer.

In an embodiment, the ATMOF component 116 may be configured to use the information included in the information structures 704, 706 to determine whether the same tunnel may be used to carry multiple services.

In an embodiment, the ATMOF component 116 may be configured to use the information included in the information structures 704, 706 to determine whether a UE 102 device may use/receive a requested service via an existing communication tunnel or whether a new communication tunnel should be created. For example, the ATMOF component 116 may use reference data to determine whether an existing tunnel will support the service characteristics (e.g., QoS requirements, etc.) of the requested service, and create a new tunnel in response to determining that none of the existing tunnels will support the service characteristics the requested service. In an embodiment, the ATMOF component 116 may be configured to create a new communication tunnel by sending a communication message to the TTF component 118 to cause the TTF component 118 to establish a new tunnel.

Figure 8A:
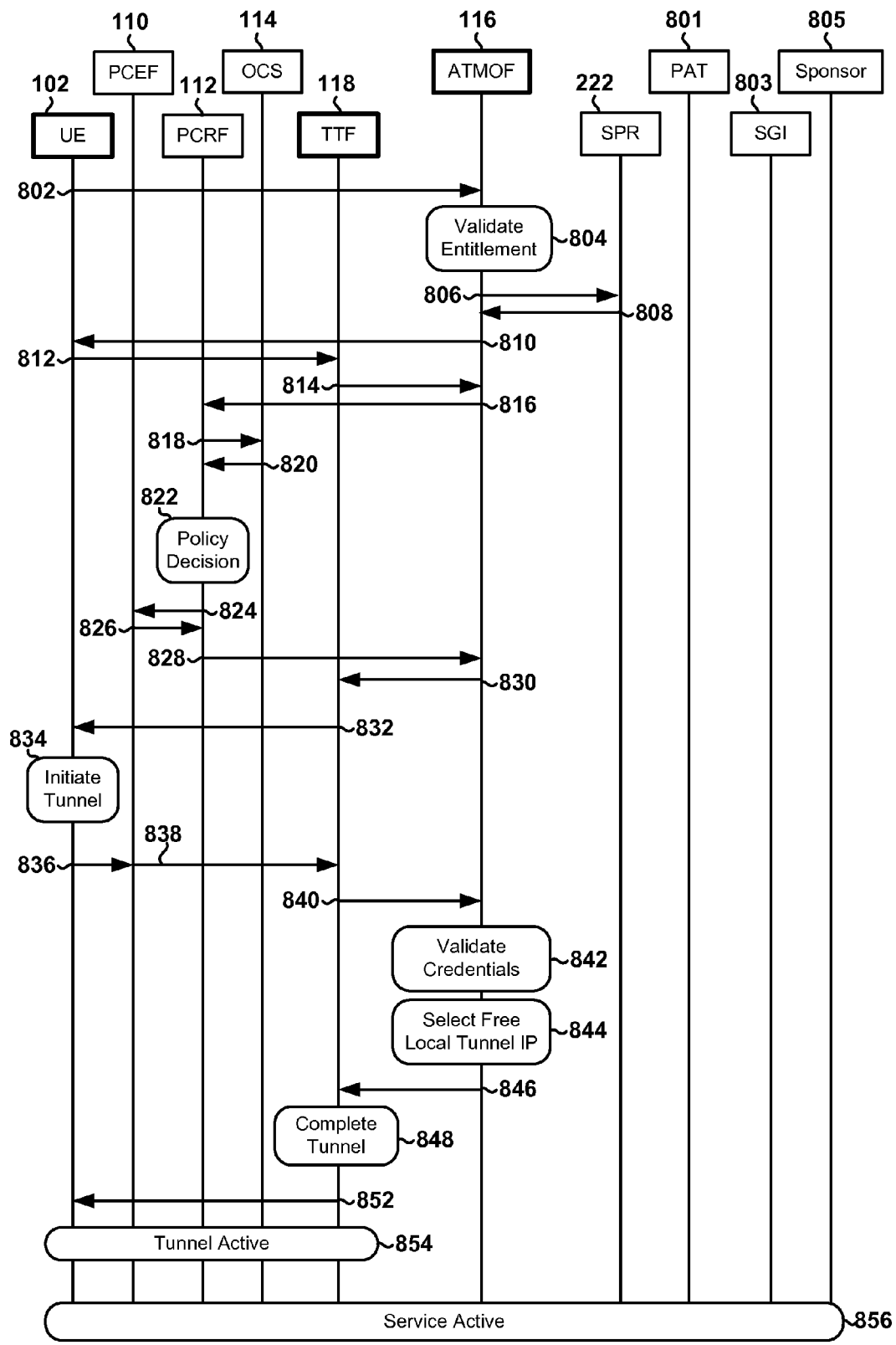
FIG. 8A is a message flow diagram illustrating example operations and message flows in a system suitable for dynamically creating a tunnel in accordance with an embodiment.
Figure 8B:
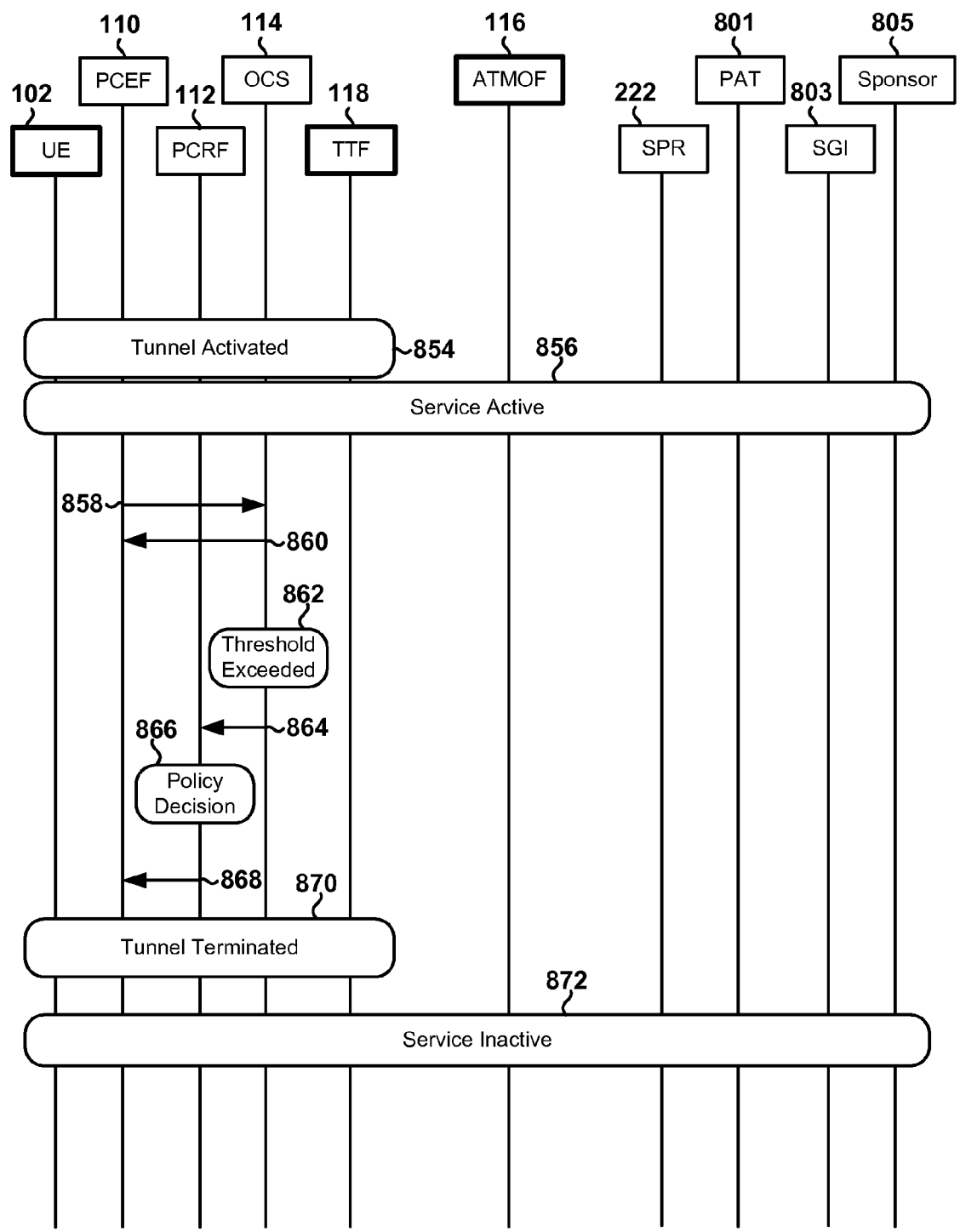
FIG. 8B is a message flow diagram illustrating example signaling and message flows suitable for terminating a dynamically created tunnel in accordance with another embodiment.

FIG. 8A illustrates example operations and message flows in a system suitable for dynamically creating a tunnel in accordance with an embodiment. FIG. 8B illustrates example signaling and message flows suitable for terminating a dynamically created tunnel in accordance with another embodiment. By performing the operations illustrated in FIGS. 8A-B, the various embodiment components (e.g., ATMOF component, etc.) may dynamically meter services that cannot otherwise be metered without very complex Traffic Flow Templates and PCC rules. That is, the embodiment components allow for the dynamic metering of services that have complex usage patterns, in coordination with policy and charging controls, via the creation and use of communication tunnels so that neither the policies nor the traffic flow end-points (e.g., end points of the network destinations 306-312 illustrated in FIG. 3) need to be pre-defined for the tunneled services or content.

In the examples illustrated in FIGS. 8A and 8B, the system includes a user equipment (UE) 102 device, a PCEF component 110, a PCRF component 112, an OCS component 114, a TTF component 118, an ATMOF component 116, an a SPR component 222, a port-address-translation (PAT) component 801, a SGI component 803, and a sponsor component 805. The UE 102 device may include client application that includes an embedded tunneling client. The PAT component 801 may be a network component that allows many internal hosts to share a single external IP address. The SGI component 803 may be a network component that is configured to use the SGi interface so as to allow the UE 102 device or TTF component 118 to communicate with the packet data networks (PDN), and thus with the partner/enterprise destinations. The sponsor component 805 may be a destination component that is in a partner/enterprise network.

With reference to FIG. 8A, in operation 802, the UE 102 device (or UE client application) may initiate the service and/or retrieval of content by generating and sending a service setup request message to the ATMOF component 116. In an alternative embodiment, a network operator system or external partner system 226 may initiate the service by generating and sending the service setup request message to the ATMOF component 116 in operation 802. The service setup request message may include information suitable for requesting the creation of a tunnel for the use of a service and for initiating the service. The service setup request message may also include information identifying a specific user, service, time, and/or data volume (e.g., MISIDN=5712911805, Service=Netflix®, Time=NOW, Amount=2 GB, etc.).

In operation block 804, the ATMOF component 116 may receive the service setup request message, and in response, perform entitlement decision operations to determine whether entitlement should be validated (i.e., whether the tunnel should be created for the use of the service by the UE 102 device). In an embodiment, as part of these entitlement decision operations, the ATMOF component 116 may request and receive subscriber information from the SPR component 222 in operations 806 and 808, respectively. For example, in an embodiment, operations 806 and 808 may be performed before operation block 804 so as to allow received subscriber information to be used as part of the entitlement decision operations.

The ATMOF component 116 may be configured to use the subscriber information and/or any other information available to the ATMOF component 116 to determine whether entitlement should be validated. For example, in various embodiments, the ATMOF component 116 may be configured to determine whether entitlement should be validated (and/or whether a tunnel should be created) based on the requested service, the requested content, the requested traffic parameters (e.g., quality of service, etc.), subscription information (e.g., user profile, price plan, history, credit state, etc.), sponsor information, partner information, enterprise information, application information (e.g., application type, specific partner application, application content, etc.), the time of day, location information, access network type (e.g., a video conferencing application may use a communication tunnel if the user equipment device is connected via a 3G/4G cellular access network, but not if the user equipment device is connected via a Wi-Fi access network), contextual information (e.g., number of active tunnels for the user device or billing account, etc.), a specific roaming partner, etc. As a further example, in operation block 804, the ATMOF component 116 may make the entitlement decision based on location information so as to allow (or disallow) the creation of a tunnel for a specific software application or service based on whether the UE 102 is currently roaming or the UE's 102 current roaming state (e.g., credit state of a roaming usage balance, etc.).

In an embodiment, the ATMOF component 116 may be configured to determine whether entitlement should be validated by performing method 400 illustrated in FIG. 4. In another embodiment, the client app, network operator system or third-party may engage in a certificate exchange directly with the TTF component 118 to initiate the establishment of the tunnel, and the TTF component 118 may request validation of the entitlement directly from the ATMOF component 116.

Returning to FIG. 8A, in response to determining that the entitlement should be validated in operation block 804, the ATMOF component 116 may generate and send a service setup response message to the UE 102 device in operation 810. The UE 102 may receive this communication message, and in operation 812, generate and send a tunnel establishment request message to the TTF component 118. In operation 814, the TTF component 118 may generate and send a tunnel entitlement verification request message to the ATMOF component 116 to request verification of the previously determined entitlement (e.g., the entitlement validated in operation block 804).

In operation 816, the ATMOF component 116 may generate and send a policy request message to the PCRF component 112 to dynamically request a policy with a single Traffic Flow Template (TFT) and billing plan that may be used to separately meter the traffic in the tunnel. In an embodiment, the policy request message may be a Diameter AA Request (AAR) message that is sent over the Rx reference point.

The PCRF component 112 is generally responsible for making a policy decision and generating or selecting policy charging rules based on a TFT. There may be different traffic profiles (e.g., TFTs) defined based on various criteria that include, but are not limited to, the sponsor, partner or enterprise, the application, content or service being delivered, the access network, location, traffic parameters (e.g., quality of service, etc.), user profile, price plan, history, credit state, the time of day, contextual information (e.g., number active tunnels for the user device or billing account, etc.), etc. The PCRF component 112 associated with these traffic profiles may specify service parameters such as the QoS to be applied to data flowing through the tunnel. For example, the profile associated with the client app for Corporation ABC may specify a high QoS whereas the profile associated with the app for small business XYZ may specify a "best effort" QoS. Alternatively, the traffic profile for a video calling app may specify a high QoS and the profile for an email or messaging app may be "best effort".

The PCRF component 112 may optionally request the subscriber's credit state from the OCS, and include this information in the criteria that are evaluated for its policy decision. For example, in operation 818, the PCRF component 112 may generate and send a charging request message to the OCS component 114. The charging request message may include information suitable for requesting charging information, such as a subscriber's credit state or current balance, from the OCS component 114. In an embodiment, the charging request message may be a Diameter Spending Limit Request (SLR) message over the Sy reference point. In operation 820, the OCS component 114 may generate and send a charging response message that includes the requested charging information to the PCRF component 112. In an embodiment, the charging response message may be a Diameter Spending Limit Answer (SLA) message.

In operation block 822, the PCRF component 112 may use the information included in the received charging response message to make a policy decision (e.g., for the creation or use of the service or tunnel), and generate or select policy charging rules for implementing the policy decision. In operation 824, the PCRF component 112 may send the policy charging rules to the PCEF component 110 for enforcement, such as via a Diameter Re-Auth Request (RAR) message over the Gx reference point. In operation 826, the PCEF component 110 may implement the received policy charging rules (e.g., for the creation or initialization of the service or tunnel), and in response, generate and send a Diameter Re-Auth Answer (RAA) message to the PCRF component 112.

The policy charging rules may include rules for setting up of a specific network resource for all tunneled traffic. For example, creating a dedicated EPS bearer in a 4G mobile network that has its own QoS profile and other service characteristics. The allocation of any specific network resources may occur when the specific sponsored application or other similarly tunneled service is launched on the UE 102.

In operation 828, the PCRF component 112 may send a policy response message that identifies the policy decision and/or policy charging rules to the ATMOF component 116. In an embodiment, the policy response message may be a Diameter AA Answer (AAA) message.

In operation 830, the ATMOF component 116 may send a tunnel entitlement verification response message to the TTF component 118 to confirm the entitlement. In operation 832, the TTF component 118 may generate and send a tunnel establishment response message to the UE 102 device.

In operation block 834, the UE 102 device may perform various operations to initiate the creation of tunnel and/or to receive the requested service via a tunnel. For example, in operation 836, the UE 102 device may generate and send a tunnel start request message to the PCEF component 110. In response, in operation 838 the PCEF component 110 may initiate the tunnel by generating and sending a tunnel start message to the TTF component 118. In operation 840, the TTF component 118 may generate and send an access request message to the ATMOF component 116. The ATMOF component 116 maintains session state information on all of the tunnels and is responsible for assigning and coordinating the IP addresses and ports for each tunneled session among the UE 102 clients, the TTF component 118, and the PCRF component 112. As such, in operation blocks 842 and 844, the ATMOF component 116 may validate the credential information included in the received access request message, select an available tunnel IP address in response to validating the credential information, and assign the selected tunnel IP address to the current session. In operation 846, the ATMOF component 116 may generate and send an access response message to the TTF component 118. In operation block 848, the TTF component 118 may use the information included in the access response message to complete the tunnel establishment operations, and generate and send a tunnel start response message to the UE 102 device in operation 852.

In an embodiment, the tunnel entitlement verification request message in operation 814 and the access request message in operation 840 may be combined into a single request message, and the combined message may be sent from the TTF component 118 to the ATMOF component 116 as part of a single operation. This streamlines the signaling message exchange between the TTF component 118 and the ATMOF component 116, and the entitlement verification and IP address assignment in operation blocks 842 and 844 all occur as part of a single request-response message exchange between the TTF component 118 and the ATMOF component 116.

In an embodiment, a separate tunnel may be established to support signaling traffic for the requested service or application, thus enabling the use of distinct service parameters (e.g., QoS) for an application's payload and signaling traffic as well as differentiated metering and charging for these traffic types. In such a scenario, the initial service setup request (from either a UE client app or a third-party system) may contain an indication of this requirement for a separate "signaling tunnel." The ATMOF component 116 may validate the entitlement for both the traffic and signaling tunnels as part of a single request-response message exchange. A similar approach may be followed with the access request message sent from the TTF component 118 to the ATMOF component 116 in operation 840.

In operation block 854, the tunnel may be activated between the UE 102 device and the TTF component 118. The UE 102 device may be a tunnel source component and the TTF component 118 may the tunnel destination component, and vice versa. As such, the UE 102 client may consume content or request/receive the service across via the tunnel in operation block 856.

The PCEF component 110 may measure the volume of usage on the tunnel and report it to the OCS component 114, as well as generate offline-charging CDRs according to the billing plan which was pushed from the ATMOF component 116 to the PCEF component 110. The ATMOF component 116 may also coordinate and synchronize the policy charging rules across the PCRF component 112, OCS component 114, and TTF component 118 (if necessary) to ensure that the tunnel usage is metered accurately and allocated correctly to the appropriate responsible party or parties.

In an embodiment the TTF component 118 may be configured to report usage consumption for each tunnel in near real-time (e.g., using AAA RADIUS accounting messages or other signaling protocol) to the ATMOF component 116 or the OCS component 114. The ATMOF component 116 may process these usage report records through various validation, aggregation and enrichment functions based on configured business rules, and also update one or more subscriber account balances that may be maintained either externally (e.g., in the OCS component 114) or internally within the ATMOF component 116. The ATMOF component 116 may then deliver the processed records to one or more downstream systems.

An operator's OCS component 114 may be used to maintain pre/post-paid and session-based and split-billed allowances for each service and/or subscriber or third-party. Split billing is the process of dividing a charge (or some portion thereof) for a service or application into two or more segments and assigning responsibility for each segment to a different party. For example, in a BYOD scenario, charges for a specific service may be split between the employer and employee. Furthermore, the employee may be subscribed to a family plan (or other type of shared plan) for non-business usage, and so the employee's portion of that service's charges may be further allocated across an individual employee account balance and a shared family account balance. In a sponsored data scenario, charges for a sponsored service may be split between the sponsor and the end-user. Alternatively, charges for sponsored content may be split between the sponsor and the content provider, in a scenario where different parties provide the sponsorship and own or deliver the content.

The ATMOF component 116 may also be responsible for coordinating with the OCS component 114 by first provisioning allowances within the OCS component 114 and then by executing certain actions as thresholds are breached, e.g., terminate tunnel, notify client application, notify enterprise administrator, request a policy change, etc.

To maintain the integrity of existing operator services, which rely on a known IP-to-Subscriber mappings in order to support ancillary services (e.g., Single Sign On), an additional mapping may be maintained between each tunnel's IP address and the associated subscriber/UE.

There may be multiple concurrent application-level tunnels running on each UE 102, e.g., one each for email, enterprise intranet, video calls, and so on. A single application need not be limited to one tunnel, and multiple tunnels may be used to differentiate separate sub-services or items of content, from within the same client application. For example, application signaling traffic may traverse a separate, dedicated tunnel.

The ATMOF component 116 may be configured so that, as part of its entitlement decisions in operation block 804, it enforces limits on the number of concurrent tunnels that are permitted for a single user device. For example, a user with a Gold subscription plan may be allowed an unlimited number of concurrent tunnels, whereas a Bronze subscriber may be limited to five. Alternatively, the number of allowed tunnels for enterprise apps and services may be unlimited, but the number of tunnels allotted for personal or other non-enterprise apps and services is limited. Limits may be enforced, not just on the number of tunnels, but also on the service provider, the duration for which the tunnel is established, volume of data traversing the tunnel, user location, service type, content type, etc.

The ATMOF component 116 may also be configured to manage subscriber provisioning within the operator's domain, such as by setting up a new user or updating an existing user in the SPR and OCS components 222, 114, as well as other transactions such as users' purchases made via the on-device application or service. In an embodiment, this may be accomplished by performing the operations of method 600 illustrated in FIG. 6.

With reference to FIG. 8B, in operations 858 and 860, the PCEF component 110 and the OCS component 114 may communicate so as to charge the third-party sponsor account for the use of the service via the tunnel by the UE 102 device. In operation block 862, the OCS component 114 may determine that a usage threshold has been exceeded based on the usage information received from the PCEF component 110. In operation 864, the OCS component 114 may notify the PCRF component 112 that the usage threshold has been exceeded. In operation block 866, the PCRF component 112 make another policy decision (e.g., that the tunnel should be terminated or the service should be discontinued), and generate or select a new set of policy charging rules for implementing the new policy decision. In operation 868, the PCRF component 112 may send the new policy charging rules to the PCEF component 110 for enforcement. In operation block 870, the tunnel between the UE 102 device and the TTF component 118 may be terminated. In operation block 872, the service may be inactivated.

Figure 9:
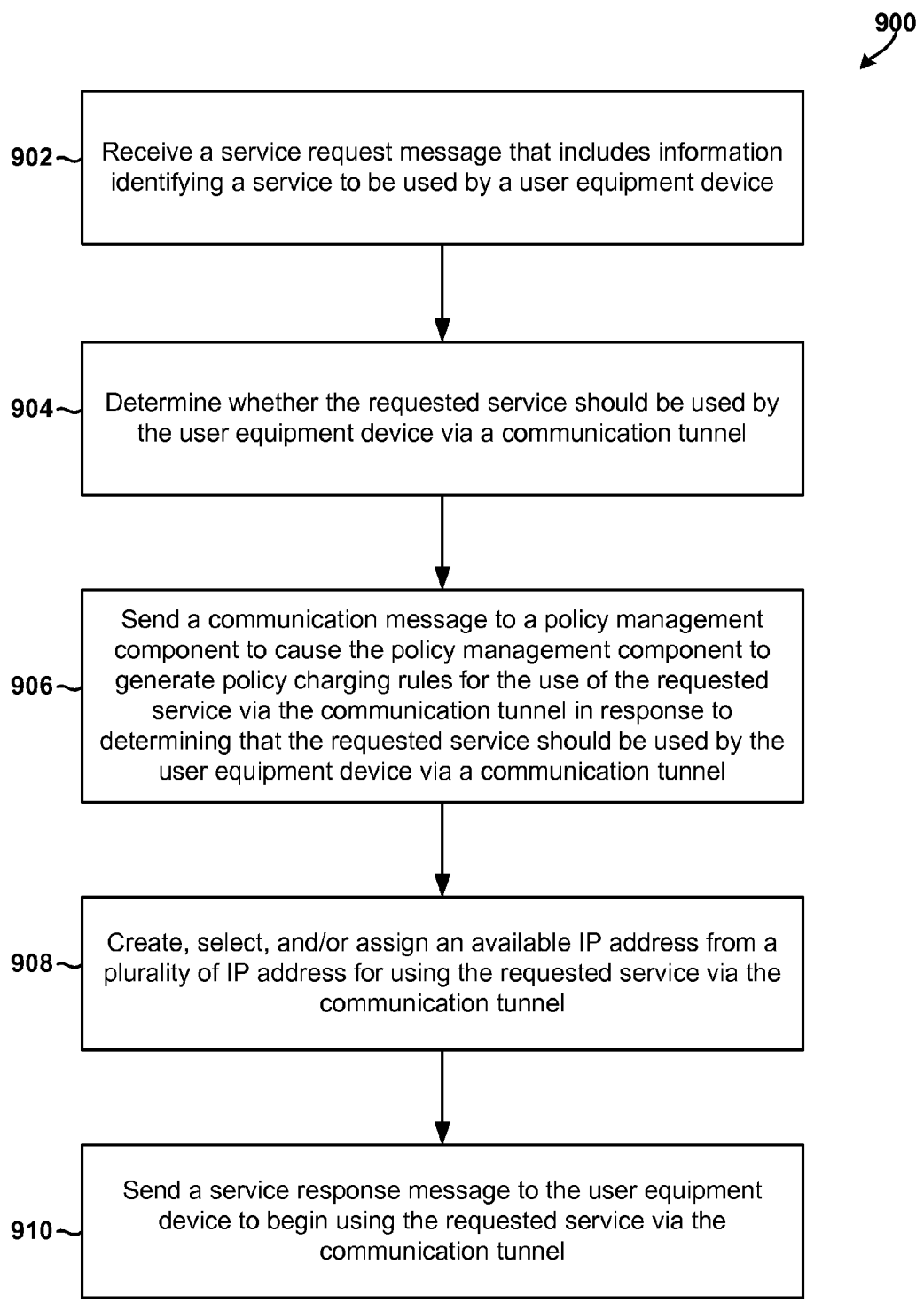
FIG. 9 is a process flow diagram illustrating a method for dynamically creating communication tunnels in accordance with an embodiment.

FIG. 9 illustrates a method 900 for dynamically creating communication tunnels in a telecommunication network in accordance with an embodiment. Method 900 may be performed by a processor or processing core of a server computing device that implements all or portions of an ATMOF component 116.

In an embodiment, the processing core may perform method 900 to create a communication tunnel between a UE 102 device and a TTF component 118 so that information that is used or generated by a service or software application travels between the TTF component 118 and the UE 102 via the communication tunnel, and between the TTF component 118 and a destination component (e.g., a component in a content network 310, etc.) outside of a tunnel. As such, the communication tunnel may be a partial tunnel that allows policy charging rules to be applied to a portion of the communication link or data flow between UE 102 device and the destination component. Performance of method 900 by a ATMOF component 116 may allow telecommunication network operators to implement improved BYOD capabilities, sponsored data models, and other technologies that require or include allocating all or portions of the responsibility for a user's use of a service or application to a third-party.

In block 902 of method 900, the processing core may receive a service request message that includes information identifying a service to be used by a UE 102 device. In various embodiments, the processing core may receive the service request message from the UE 102 device, a TTF component 118, a third party partner or sponsor component, etc. In an embodiment, the service request message may be a service setup request message. In an embodiment, the service request message may be a tunnel entitlement verification request message.

In block 904, the processing core may determine whether all or portions of the requested service should be used by the UE 102 device via a communication tunnel, such as by validating the credentials or entitlement. For example, in block 904, the processing core may request and receive subscriber information from a subscriber repository (e.g., SPR component 222), and use the received subscriber information (and/or any other information available to the ATMOF component 116) to determine whether the entitlement should be validated. The processing core may determine that the requested service should be used by the UE 102 device via a communication tunnel in response to determining that the entitlement should be validated. Alternatively or in addition, in block 904, the processing core may determine whether the requested service should be used via a communication tunnel by using the information included in the received service request message to authenticate credentials and/or to validate a data usage entitlement of the user equipment device. A data usage entitlement may be a component or information structure that may be used to determine whether a service consumed by the UE 102 device requires use of a communication tunnel, and further, whether the user and service are authorized (e.g., based on specified entitlement decision criteria) to use the communication tunnel. As such, validating the data usage entitlement may include determining whether the service requires use of a communication tunnel and/or whether the user and service are authorized to use the communication tunnel.

The processing core may also determine whether the service should be used by the UE 102 device via a communication tunnel based on information received from a policy management system and/or a charging component.

Certain applications on the UE 102 device may be automatically authorized or pre-authorized to utilize a communication tunnel so that it is not necessary for a subscriber profile repository to be queried as part of the entitlement validation. For example, a voice over Wi-Fi (VoWiFi) application residing on the UE 102 device may be pre-authorized to create and use a communication tunnel, in which case the entitlement may be validated in block 904 without querying the subscriber profile repository.

In block 906, the processing core may send a communication message to a policy management component (e.g., PCRF component 112) to cause the policy management component to generate policy charging rules for the use of the requested service via a communication tunnel. In an embodiment, the processing core may send the communication message to a policy management component in response to determining that the requested service should be used by the user equipment device via a communication tunnel (i.e., in response to determining that a tunnel should be created or used to communicate information that is generated or used by the service). In block 908, the processing core may select and assign an available IP address from a plurality of IP address for using the requested service (e.g., for sending and receiving information related to the service) via the communication tunnel. It should be understood that, in various embodiments, the processing core may perform the operations of block 908 before, concurrent with, or after the operations of block 906. In an embodiment, the processing core may include the IP address selected in block 908 in the communication message sent to the policy management component.

In block 910, the processing core may generate and send a service response message to the UE 102 device to begin using the requested service via the communication tunnel. In an embodiment, this may be accomplished by sending a service response message to a TTF component 118, which then forwards the message (or an equivalent message) to the UE 102 device. In another embodiment, the ATMOF component 116 may send the service response message directly to the UE 102 device. In an embodiment, the service response message may include information suitable for causing the UE 102 device to initiate the creation of the communication tunnel. The service response message may also include information suitable for causing the UE 102 device to send a communication message to the TTF component 118 that causes the TTF component 118 to perform tunnel establishment operations.

Figure 10:
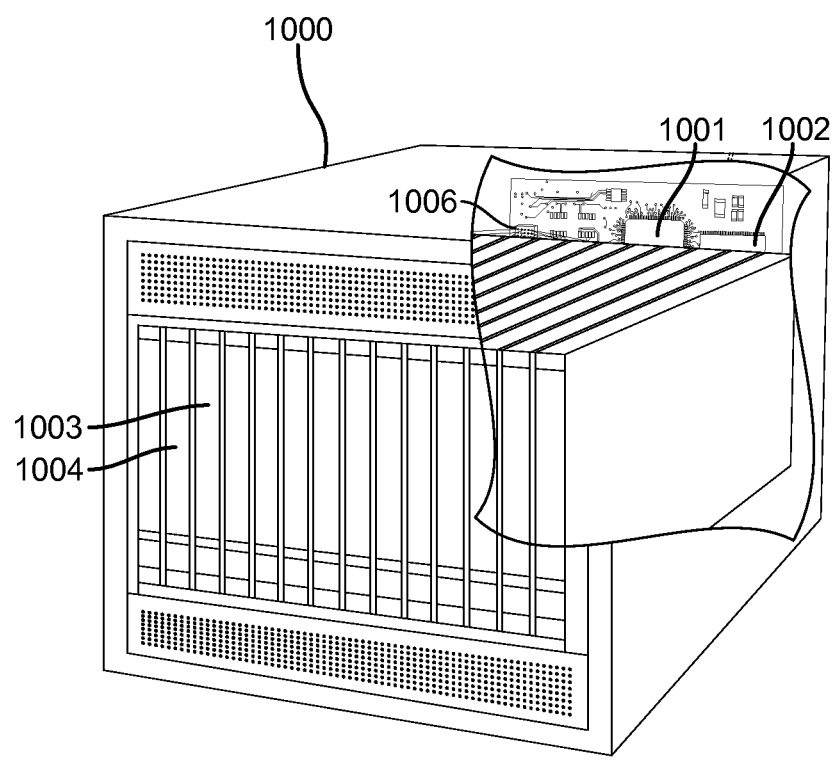
FIG. 10 is a component diagram of server suitable for implementing various embodiments.

The various embodiments, including the ATMOF component 116 and TTF component 118 discussed above may be implemented on any of a variety of commercially available server devices, such as the server 1000 illustrated in FIG. 10. Such a server 1000 typically includes a processor 1001 or processor cores coupled to volatile memory 1002 and a large capacity nonvolatile memory, such as a disk drive 1003. The server 1000 may also include a floppy disc drive, compact disc (CD) or DVD disc drive 1004 coupled to the processor 1001. The server 1000 may also include network access ports 1006 coupled to the processor 1001 for establishing data connections with a network, such as a local area network coupled to other operator network computers and servers.

The processor 1001 may be any programmable microprocessor, microcomputer or multiple processor chip or chips that can be configured by processor-executable software instructions to perform a variety of functions, including the functions and operations of the various embodiment methods described above. Multiple processors 1001 or processor cores may be provided, such as one processor dedicated to managing network communication functions and one processor dedicated to performing the embodiment methods described above. Typically, processor-executable software applications may be stored in the internal memory 1002, 1003 before they are accessed and loaded into the processor 1001. The processor 1001 may include internal memory sufficient to store the application software instructions.

The foregoing method descriptions and the process flow diagrams are provided merely as illustrative examples and are not intended to require or imply that the blocks of the various embodiments must be performed in the order presented. As will be appreciated by one of skill in the art the order of steps in the foregoing embodiments may be performed in any order. Words such as "thereafter," "then," "next," etc. are not intended to limit the order of the blocks these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. Alternatively, some steps or methods may be performed by circuitry that is specific to a given function.

The functions of the various embodiment methods may be implemented in hardware, software, firmware, or any combination thereof. If implemented in software, processor-executable instructions or code for performing the functions may be stored on a non-transitory computer-readable medium or non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of dynamically creating communication tunnels in a telecommunication network, the method comprising:
   receiving in a processor of a server computing device a service request message that includes information identifying a service to be used by a user equipment device;
   determining by the processor whether the requested service should be used by the user equipment device via a communication tunnel;
   sending a communication message to a policy management component to cause the policy management component to generate policy charging rules for the use of the requested service via the communication tunnel in response to determining that the requested service should be used by the user equipment device via the communication tunnel;
   selecting and assigning an available Internet protocol (IP) address from a plurality of IP address for using the requested service via the communication tunnel; and
   sending a service response message to the user equipment device to begin using the requested service via the communication tunnel,
   wherein selecting and assigning an available IP address from the plurality of IP address for using the requested service via the communication tunnel comprises selecting the available IP address from a stateful repository of available and previously assigned IP addresses.

2. The method of claim 1, wherein determining whether the requested service should be used by the user equipment device via the communication tunnel comprises:
   querying a subscriber profile repository to receive subscription information; and
   using the received subscription information to determine whether the requested service should be used by the user equipment device via the communication tunnel.

3. The method of claim 1, wherein determining whether the requested service should be used by the user equipment device via the communication tunnel comprises:
   authenticating credentials included in the received service request message; and
   validating a data usage entitlement of the user equipment device.

4. The method of claim 3, wherein validating the data usage entitlement of the user equipment device comprises evaluating an entitlement decision criterion based on one of:
   content information;
   service information;
   traffic parameter information;
   subscription information;
   sponsor information;
   partner information;
   enterprise information;
   application information;
   location information;
   access network type information;
   contextual information; and
   signalling requirement information.

5. The method of claim 3, wherein authenticating the credentials included in the received service request message comprises using one of subscription identifier information, user equipment device identification information, and framed IP address information included in the received service request message to authenticate the credentials.

6. The method of claim 1, further comprising:
receiving by the processor a usage report for usage of the service via the communication tunnel from a tunnel termination function component; and
using the received usage report to meter the usage of the requested service by the user equipment device.

7. The method of claim 6, further comprising:
communicating with a charging system to update account balance information based on the received usage report.

8. A non-transitory computer readable storage medium storing processor-executable software instructions which when executed by a processor performs operations comprising:
receiving a service request message that includes information identifying a service to be used by a user equipment device;
determining whether the requested service should be used by the user equipment device via a communication tunnel;
sending a communication message to a policy management component to cause the policy management component to generate policy charging rules for the use of the requested service via the communication tunnel in response to determining that the requested service should be used by the user equipment device via the communication tunnel;
selecting and assigning an available Internet protocol (IP) address from a plurality of IP address for using the requested service via the communication tunnel; and
sending a service response message to the user equipment device to begin using the requested service via the communication tunnel,
wherein selecting and assigning an available IP address from the plurality of IP address for using the requested service via the communication tunnel comprises selecting the available IP address from a stateful repository of available and previously assigned IP addresses.

9. The non-transitory computer readable storage medium of claim 8, stores additional processor-executable software which when executed by the processor further performs operations comprising: determining whether the requested service should be used by the user equipment device via the communication tunnel comprises: querying a subscriber profile repository to receive subscription information; and using the received subscription information to determine whether the requested service should be used by the user equipment device via the communication tunnel.

10. The non-transitory computer readable storage medium of claim 9, stores second additional processor-executable software which when executed by the processor further performs operations comprising: determining whether the requested service should be used by the user equipment device via the communication tunnel comprises:
authenticating credentials included in the received service request message; and validating a data usage entitlement of the user equipment device.

11. The non-transitory computer readable storage medium of claim 10, stores third additional processor-executable software which when executed by the processor further performs operations comprising: authenticating the credentials included in the received service request message comprises using one of a subscription identifier information, user equipment device identification information, and framed IP address information included in the received service request message to authenticate the credentials.

12. The non-transitory computer readable storage medium of claim 10, stores fourth additional processor-executable software which when executed by the processor further performs operations comprising: validating the data usage entitlement of the user equipment device comprises evaluating an entitlement decision criterion based on one of:
content information;
service information;
traffic parameter information;
subscription information;
sponsor information;
partner information;
enterprise information;
enterprise information;
application information;
location information; access network type information;
contextual information;
contextual information; and
signaling requirement information.

13. The non-transitory computer readable storage medium of claim 8, stores sixth additional processor-executable software which when executed by the processor further performs operations comprising:
receiving by the processor a usage report for usage of the service via the communication tunnel from a tunnel termination function component; and using the received usage report to meter the usage of the requested service by the user equipment device.

14. The non-transitory computer readable storage medium of claim 13, stores seventh additional processor-executable software which when executed by the processor further performs operations comprising:
communicating with a charging system to update account balance information based on the received usage report.

15. A server computing device comprising:
a policy management component;
a memory storing processor-executable instructions,
a processor coupled to the policy management component and also coupled to the memory wherein the processor upon executing the processor-executable instructions performs operations comprising:
receiving a service request message that includes information identifying a service to be used by a user equipment device;
determining whether the requested service should be used by the user equipment device via a communication tunnel;
sending a communication message to a policy management component;
wherein the policy management component is configured to: upon receiving the communication message, generate policy charging rules for the user of the requested service via the communication tunnel, determining that the requested service should be used by the user equipment device via the communication tunnel;
selecting and assigning an available Internet protocol (IP) address from a plurality of IP address for using the requested service via the communication tunnel; and
sending a service response message to the user equipment device to begin using the requested service via the communication tunnel,
wherein selecting and assigning an available IP address from the plurality of IP address for using the requested service via the communication tunnel comprises selecting the available IP address from a stateful repository of available and previously assigned IP addresses.

16. The server computing device of claim 15, wherein the memory stores additional processor-executable instructions which upon being executed by the processor perform operations comprising: determining whether the requested service should be used by the user equipment device via the communication tunnel comprises: querying a subscriber profile repository to receive subscription information; and using the received subscription information to determine whether the requested service should be used by the user equipment device via the communication tunnel.

17. The server computing device of claim 15, wherein the memory stores second additional processor-executable instructions which upon being executed by the processor perform operations comprising:
  determining whether the requested service should be used by the user equipment device via the communication tunnel comprises:
  authenticating credentials included in the received service request message; and
  validating a data usage entitlement of the user equipment device by evaluating an entitlement decision criterion based on one of:
  content information;
  service information;
  traffic parameter information;
  subscription information;
  sponsor information;
  partner information;
  enterprise information;
  enterprise information;
  application information;
  location information; access network type information;
  contextual information;
  contextual information; and
  signaling requirement information.

18. The server computing device of claim 15, wherein the memory stores a third additional processor-executable instructions which upon being executed by the processor perform operations comprising:
  receiving by the processor a usage report for usage of the service via the communication tunnel from a tunnel termination function component; using received usage report to meter the usage of the requested service by the user equipment device; and communicating with a charging system to update the account balance information based on the received usage report.

* * * * *